(12) United States Patent
Matthews

(10) Patent No.: US 11,889,137 B2
(45) Date of Patent: *Jan. 30, 2024

(54) SYSTEMS AND METHODS FOR SEAMLESSLY CONNECTING DEVICES BASED ON RELATIONSHIPS BETWEEN THE USERS OF THE RESPECTIVE DEVICES

(71) Applicant: Rovi Guides, Inc., San Jose, CA (US)

(72) Inventor: Sean Matthews, Los Altos, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,653

(22) Filed: Feb. 1, 2023

(65) Prior Publication Data

US 2023/0188773 A1    Jun. 15, 2023

Related U.S. Application Data

(63) Continuation of application No. 17/696,090, filed on Mar. 16, 2022, now Pat. No. 11,601,700, which is a continuation of application No. 17/346,571, filed on Jun. 14, 2021, now Pat. No. 11,310,547, which is a continuation of application No. 16/857,412, filed on Apr. 24, 2020, now Pat. No. 11,076,183, which is a
(Continued)

(51) Int. Cl.
| | | |
|---|---|---|
| *H04N 21/258* | (2011.01) | |
| *H04N 21/4788* | (2011.01) | |
| *H04N 21/45* | (2011.01) | |
| *H04N 21/466* | (2011.01) | |
| *H04N 21/47* | (2011.01) | |
| *H04W 12/63* | (2021.01) | |

(52) U.S. Cl.
CPC . *H04N 21/25875* (2013.01); *H04N 21/25841* (2013.01); *H04N 21/4532* (2013.01); *H04N 21/4668* (2013.01); *H04N 21/47* (2013.01); *H04N 21/4788* (2013.01); *H04W 12/63* (2021.01)

(58) Field of Classification Search
None
See application file for complete search history.

(56) References Cited

U.S. PATENT DOCUMENTS 6,239,794 B1   5/2001  Yuen et al.
6,564,378 B1   5/2003  Satterfield et al.
(Continued)

*Primary Examiner* — Alexander Q Huerta
(74) *Attorney, Agent, or Firm* — Haley Guiliano LLP

(57) ABSTRACT

Systems and methods are described for seamlessly connecting devices based on relationships between the users of the respective devices. A media guidance application may determine that a first user has entered an environment (e.g., his/her mother's home) and may determine a frequency with which the first user enters the environment (e.g., daily). In response to determining that the first user visits frequently, the media guidance application may identify a second device in the environment (e.g., a smart TV) that a second user (e.g., the first user's mother) is authorized to grant access rights for. The media guidance application may determine a likelihood that the second user will grant the access rights for the second device to the first user, based on interaction data between the first user and the second user. In response to determining a high likelihood, the media guidance application may transmit the access rights.

20 Claims, 15 Drawing Sheets

Related U.S. Application Data continuation of application No. 16/444,688, filed on Jun. 18, 2019, now Pat. No. 10,674,194, which is a continuation of application No. 15/997,975, filed on Jun. 5, 2018, now Pat. No. 10,375,432.

(56) References Cited

U.S. PATENT DOCUMENTS

| | | | |
|---|---|---|---|
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 8,270,684 B2 | 9/2012 | Kiyohara et al. | |
| 8,726,344 B1 | 5/2014 | Amidon et al. | |
| 9,094,360 B1 | 7/2015 | Bapat | |
| 9,197,733 B2 | 11/2015 | Grdenfors et al. | |
| 10,375,432 B1 | 8/2019 | Matthews | |
| 10,412,434 B1 | 9/2019 | Matthews | |
| 10,432,728 B2 | 10/2019 | Dachille et al. | |
| 2002/0174430 A1 | 11/2002 | Ellis et al. | |
| 2005/0245233 A1* | 11/2005 | Anderson | H04L 67/75 455/411 |
| 2005/0251827 A1 | 11/2005 | Ellis et al. | |
| 2006/0123081 A1 | 6/2006 | Ahya | |
| 2006/0212931 A1 | 9/2006 | Shull et al. | |
| 2007/0209063 A1 | 9/2007 | Ohto | |
| 2007/0291694 A1 | 12/2007 | Zhang | |
| 2008/0081558 A1 | 4/2008 | Dunko et al. | |
| 2008/0220775 A1* | 9/2008 | Tischer | H04W 12/068 455/435.1 |
| 2008/0267591 A1* | 10/2008 | Wachtfogel | H04N 21/4586 348/E5.002 |
| 2009/0064346 A1 | 3/2009 | Larsson et al. | |
| 2009/0254980 A1* | 10/2009 | Kanaparti | H04L 63/107 726/4 |
| 2010/0153885 A1 | 6/2010 | Yates | |
| 2011/0107436 A1* | 5/2011 | Cholas | H04N 21/2585 726/29 |
| 2012/0270522 A1 | 10/2012 | Laudermilch et al. | |
| 2012/0317194 A1 | 12/2012 | Tian | |
| 2013/0005383 A1 | 1/2013 | Isberg et al. | |
| 2013/0125212 A1 | 5/2013 | Lee | |
| 2013/0229929 A1 | 9/2013 | Linsky | |
| 2014/0053078 A1 | 2/2014 | Kannan | |
| 2014/0057563 A1 | 2/2014 | Salahshoor | |
| 2014/0090033 A1 | 3/2014 | Lerner et al. | |
| 2014/0099978 A1 | 4/2014 | Egner et al. | |
| 2014/0105561 A1 | 4/2014 | Chen et al. | |
| 2014/0141714 A1 | 5/2014 | Ghosh et al. | |
| 2014/0165160 A1 | 6/2014 | Bae et al. | |
| 2014/0215558 A1* | 7/2014 | Hoyos | H04L 63/107 726/3 |
| 2015/0067889 A1 | 3/2015 | Baikalov et al. | |
| 2015/0193069 A1 | 7/2015 | Di Censo et al. | |
| 2016/0044385 A1* | 2/2016 | Kareeson | G06Q 20/1235 725/27 |
| 2016/0253710 A1 | 9/2016 | Publicover et al. | |
| 2016/0269881 A1 | 9/2016 | Klappert et al. | |
| 2017/0055032 A1 | 2/2017 | Oshima et al. | |
| 2017/0329790 A1 | 11/2017 | Johns et al. | |
| 2018/0041559 A1 | 2/2018 | Chen | |
| 2019/0104411 A1 | 4/2019 | Hotchkiss et al. | |
| 2019/0373299 A1 | 12/2019 | Matthews | |
| 2021/0314641 A1 | 10/2021 | Matthews | |
| 2022/0368968 A1 | 11/2022 | Matthews | |

* cited by examiner

SYSTEMS AND METHODS FOR SEAMLESSLY CONNECTING DEVICES BASED ON RELATIONSHIPS BETWEEN THE USERS OF THE RESPECTIVE DEVICES

CROSS-REFERENCE TO RELATED APPLICATIONS

This application is a continuation of U.S. patent application Ser. No. 17/696,090, filed Mar. 16, 2022, which is a continuation of U.S. patent application Ser. No. 17/346,571, filed Jun. 14, 2021 (now U.S. Pat. No. 11,310,547), which is a continuation of U.S. patent application Ser. No. 16/857,412, filed Apr. 24, 2020 (now U.S. Pat. No. 11,076,183), which is a continuation of U.S. patent application Ser. No. 16/444,688, filed Jun. 18, 2019 (now U.S. Pat. No. 10,674,194), which is a continuation of U.S. patent application Ser. No. 15/997,975 (now U.S. Pat. No. 10,375,432), the disclosures of each application are incorporated by reference in their entireties.

BACKGROUND

In the related art, in response to receiving a request to share content from a sending device, a system may share the content with receiving device(s) that are capable of loading the content and are in close proximity to the sending device. However, the related art does not determine whether to connect the sending device with the receiving device based on the relationship of the users/owners of those respective devices. Furthermore, when sharing content from the sending device, with the receiving device, the related art does not consider whether the shared content features an individual related to the owner of the receiving device. The related art simply makes the connection based on the proximity of the devices and the type of content (e.g., video, photo, etc.) of the shared content. This may cause security and privacy concerns.

SUMMARY

Systems and methods are thus described that address these issues by seamlessly connecting devices based on relationships between the users of the respective devices, and in some aspects, seamlessly connecting a device to a user's device in order to share and display content featuring an individual closely related to the user. The systems and methods address the security and privacy of the user's device by establishing automatic connections only when the user is familiar and comfortable with the individual that is trying to connect to the user's device. Furthermore, the systems and methods free the user from making a multitude of decisions on whether to allow connections, by determining a likelihood of whether the user would approve/deny a request to connect, and automatically connecting/blocking accordingly.

Suppose that a user enters an environment, such as the home of the user's mother. A media guidance application on the user's smartphone may determine that the user has entered the home and frequently visits (e.g., on a daily basis). In response, the media guidance application may identify other devices in the home (e.g., smart speaker, computer, television, etc.) that may belong to the user's mother. The media guidance application on one of the identified devices (e.g., television) may retrieve interaction data between the user and the user's mother. For example, the media guidance application may refer to phone calls, social media posts, emails, and texts, to determine a degree of interaction between the user and the user's mother. Based on the degree of interaction and how often the user visits the home, the media guidance application on the television may determine to grant and transmit access rights for the television to the user's smartphone.

In an alternate aspect, in response to determining that the user has entered the home of the user's mother, the media guidance application on the user's smartphone may determine that the user has recently captured images of an individual related to the user's mother. For example, recent pictures of the user's daughter may be stored on the user's smartphone. In response to determining that the user's daughter is the granddaughter of the user's mother, the media guidance application on the user's smartphone may send a request to connect to a device in the environment (e.g., a television) in order to share the images. In this example, the media guidance application on the television may retrieve interaction data between the user's daughter and the user's mother to determine a degree of interaction (e.g., how often the user's daughter and the user's mother interact). Based on the degree of interaction and how recent the images are, the media guidance application on the television may determine to grant and transmit access rights for the television to the user's smartphone. In response to receiving the access rights, the pictures may be shared and displayed on the television.

In some aspects, the media guidance application may determine that a first user, carrying a first device comprising profile information of the first user, has entered an environment of a second user. For example, the first device may be the user's smartphone. The profile information of the user may include information about the user's preferences, device settings, media viewing history, social media data, usage statistics, calendar, location history, etc. The global positioning system (GPS) on the first device may be used by the media guidance application to determine that the user has entered the environment (e.g., the house of the user's mother).

In some embodiments, the media guidance application may determine, using sensor circuitry, a first location of the first user and may determine a second location of the second user. The sensor circuitry may be a GPS embedded in the first device of the first user that can provide coordinates of the first user. If the first device is connected to Wi-fi, a triangulation process can be used to determine the relative position of the first user based on the strength of Wi-fi signals received from multiple routers in the vicinity. The location of the second user may also be determined using a GPS embedded in a device of the second user, or Wi-fi triangulation.

In some embodiments, the first device of the first user may connect to an IP network that is associated with the second user or that a second device of the second user is connected to. For example, the first device may connect to a router owned by the second user in order to access the Internet. This connection may signify that the first user has previously interacted with the second user and thus, can be used to determine the relationship between the respective users.

The media guidance application may determine that the second location of the second user corresponds to a location of the environment (e.g., his/her house). For example, if GPS coordinates are determined at the device of the second user and the approximate GPS coordinates of the second user's environment are retrieved (e.g., by determining the address of the second user's house), the media guidance application may determine that the respective GPS coordinates match. Therefore, the second user may be located in the environment. The media guidance application may then determine that the first location of the first user and the second location of the second user are within a threshold proximity. In some embodiments, the threshold proximity may be represented by a circle with a diameter as large as the length of the environment (e.g., 30 feet). In response to determining that the first location and the second location are within the threshold proximity, the media guidance application may thus determine that the first location corresponds to the location of the environment.

In some embodiments, the media guidance application may retrieve profile information of the second user. For example, the media guidance application may retrieve the location history of the second user and contact information. Based on the profile information of the second user, the media guidance application may determine that both the environment and the devices inside the environment are owned by the second user.

The media guidance application may, in response to determining that the first user has entered the environment, determine, based on the profile information of the first user, a frequency with which the first user enters the environment. For example, the media guidance application may retrieve the location history of the first user. The location history may indicate the number of times the first user has visited the environment. The location history may be divided in periods of time. For example, the media guidance application may determine that the user has entered the house ten times in the past month. Similarly, the media guidance application may determine that the user has entered the house 1000 times since the location history began keeping record of the user's visits.

The media guidance application may determine whether the frequency is greater than a frequency threshold. In response to determining that the frequency is greater than the frequency threshold, the media guidance application may transmit a discovery message to identify devices in the environment. The frequency threshold may be a preset value representing the minimum visits the first user must make in a period of time (e.g., four visits per month) in order to automatically transmit a discovery message to the devices in the environment. The frequency threshold may be retrieved from a media guidance database associated with the media guidance application. The first user may adjust the frequency threshold to alter how often the first device may automatically transmit discovery messages. For example, the first user may increase the frequency threshold. As a result, in order for the first device to automatically transmit a discovery message, the first user must enter the environment more frequently. The second user may also set the frequency threshold such that any user that enters the environment an amount of times less than the frequency threshold may not transmit discovery messages, and if a discovery message is transmitted, the devices in the environment may not respond to the discovery message based on the second user's set frequency threshold. In the example previously given, the frequency of the user is ten visits per month, which is greater than the frequency threshold of four visits per month. Therefore, the media guidance application may transmit a discovery message.

The media guidance application may then identify a second device in the environment based on the discovery message. For example, a second device (e.g., a smart speaker) in the environment may receive the discovery message. In response, the second device may send an acknowledgment message to the first device. The acknowledgment message may include information about the device such as a device identifier (e.g., a device name), a device type (e.g., multimedia system, phone, tablet, etc.), authorized users, the location of device in the environment, etc., and/or timestamps signifying when the discovery message was received and when the acknowledgment was transmitted.

The media guidance application may then determine that the second user is authorized to grant access rights for the second device. For example, the media guidance application may parse the acknowledgment message to determine a list of authorized users who may grant access rights for the second device. The access rights may be a digital key, or a set of digital keys, that allows a device to connect to the second device in order to send and/or receive data (e.g., media content), and/or utilize a functionality of the second device (e.g., the ability to display video or output audio). Without the access rights (e.g., the digital key), the second device may at most send an acknowledgement message to the first device in response to receiving the discovery message. However, additional messages requesting data such as media content may be blocked by the second device.

The media guidance application may then retrieve interaction data of the first user and the second user. Interaction data may include any information indicating communication between the first user and the second user, during a period of time. Interaction data may include, but is not limited to, call logs, social media posts, messages, shared location history, emails, etc. The interaction data may also list all users the second user has interacted with during the period of time.

The media guidance application may determine a degree of interaction between the first user and the second user based on the interaction data. In some embodiments, the media guidance application may determine the degree of interaction between the first user and the second user by first determining, based on the interaction data, a communication frequency of electronic communications, between the first user and the second user. Electronic communications include, but are not limited to, voice calls, video chats, social media posts, messages, emails, etc. Based on the communication frequency, the media guidance application may determine the degree of interaction. For example, the media guidance application may identify, from the interaction data, the electronic communications exchanged between the first user and the second user in a period of time. Suppose the electronic communications between the second user and the first user include text messages exchanged and video chats that both participated in. The media guidance application may determine a length of each electronic communication of the electronic communications exchanged. For example, the length of the text messages may be described by the total number of words used in each of the text messages exchanged and the length of the video chats may be described by the total amount of time both the second user and the first user spent talking to one another in their video chats.

The media guidance application may then determine a set of electronic communications. The set of electronic communications may include electronic communications whose respective lengths are greater than a length threshold. The length threshold may be a preset value determined by the second user, representing a minimum length of an electronic communication in order to be considered significant. For example, exchanged text messages that only featured five words may not be considered significant communication. Accordingly, the length threshold for textual electronic communications may be 20 words. Similarly, the length threshold for a video chat may be five minutes. The media guidance application may then determine a number of electronic communications in the set of electronic communications. Suppose a total of thirty text messages and ten logs of video chats of a span of ten days are originally retrieved. Based on the length threshold, the media guidance application may determine that ten text messages feature at least 20 words and four logs feature video chats that lasted at least five minutes. In this example, multiple types of electronic communications are considered. In some embodiments, the media guidance application may apply various weights to each type of electronic communication. For example, the media guidance application may weigh video chats ten times greater than text messages because video chats are more interactive than text messages. Accordingly, the total number of electronic communications may be weighted as fifty electronic communications (e.g., 10 text messages+4 logs of video chats multiplied by 10). Based on the number of electronic communications, or the weighted number of electronic communications, the media guidance application may determine the communication frequency (e.g., daily, weekly, annually, etc.). For example, the media guidance application may determine that based on a span of ten days, the communication frequency using the weight electronic communications is five electronic communications per day.

The media guidance application may then determine a likelihood that the second user will grant the access rights for the second device to the first user, based on the degree of interaction and the frequency. In some embodiments, when determining the likelihood that the second user will grant the access rights for the second device to the first user, the media guidance application may retrieve a connection history of the second device that lists previous devices and their respective users that have either been granted or denied access rights to the second device. For example, the connection history may list three entries, each comprising a timestamp at which a connection between a device and the second device was requested (e.g., 3/1/18 10:23:11 pm), an identifier of the device (e.g., "smartphone"), an identifier of the user of the device (e.g., "Bart Simpson"), additional details about the connection (e.g., the frequency of visits of the respective user, calculated likelihood, degree of interaction, etc.), and a determination by the second user on whether to grant access rights (e.g., granted/denied).

The media guidance application may generate a probabilistic model that estimates likelihoods using, as training data, respective degrees of interaction and frequencies associated with the respective users that have either been granted or denied access rights to the second device. For example, the media guidance application may utilize machine learning and/or deep learning algorithms (e.g., regression, classification) to determine the likelihood. The media guidance application may use the labeled entries from the connection history as training data to create a probabilistic model that is a function of the degree of interaction and the frequency. The media guidance application may then estimate, using the probabilistic model, the likelihood based on the degree of interaction and the frequency. For example, if the degree of interaction is 40% and the frequency is ten visits per month, the probabilistic model may output an estimate of 70%. This likelihood suggests that there is a 70% chance that the second user will grant access rights to the first device, given the approvals/blocks the second user has established in the past.

Analogous to the second user deciding on whether to grant access rights for the second device to the first user, the media guidance application uses the threshold as a decision boundary to determine whether to transmit the access rights to the first user. Accordingly, the threshold may be a preset value set by the second user. If the second user assigns a higher threshold, receiving access rights from the second device may require a greater likelihood. As a result, the first user may need to interact more with the second user, or the frequency of visits may need to be higher. Suppose the threshold is 65%. Because the likelihood (e.g., 70%) is greater than the threshold, the media guidance application may grant access rights for the second device to the first device.

In some embodiments, when transmitting the access rights for the second device to the first device, the media guidance application may determine that the frequency is less than a second frequency threshold associated with a second level of access to the second device. In this case, suppose that the frequency threshold is a first frequency threshold associated with a first level of access to the second device and that the second level of access is greater than the first level of access. Each level of access may be associated with the ability to send and/or receive messages, an ability to access content, and/or access to some functionality of the second device. For example, the first level of access may allow the first device to send and/or receive messages from the second device. Thus, the two respective devices may share information. The second level of access may allow the first device to utilize a functionality of the second device, such as the ability to use the display screen of the second device. Each subsequent level of access may include all access rights from the previous level of access, along with additional access rights. Accordingly, each level of access may have its own frequency threshold (e.g., four visits per month, 11 visits per month, 15 visits per month, etc.).

In response to determining that the frequency is less than the second frequency threshold, the media guidance application may transmit the access rights associated with the first level of access for the second device to the first device and restrict the first device from the access rights associated with the second level of access. As discussed in the previous example, the media guidance application may determine that the frequency (e.g., ten visits per month) is greater than the first frequency threshold (e.g., four visits per month). If the second frequency threshold has a value of 11 visits per month, the media guidance application may determine that the frequency is less than the second frequency threshold. In response, the media guidance application may restrict the first device from the access rights associated exclusively with the second level of access, and may grant access rights to the first device that are associated with the first level of access.

In some embodiments, when transmitting the access rights for the second device to the first device, the media guidance application may determine, based on the profile information of the first user, that an event is occurring in the environment. In addition, both the first user and the second user may be participants of the event. For example, the media guidance application of the first device may retrieve a calendar of the first user. The calendar may list an event that is to take place during the time the first user visits the environment. Suppose that the event is a birthday party. The media guidance application may determine that both the first user and the second user are going to participate in the event (e.g., the second user may have invited the first user, or both users may have accepted an invitation). The first user may want to connect his/her smartphone to a smart speaker of the second user to share and play songs on the smart speaker. In response to determining that the event is occurring in the environment, the media guidance application may transmit the access rights for the second device to the first device.

In some embodiments, when transmitting the access rights for the second device to the first device, the media guidance application may automatically establish a peer-to-peer connection between the first device and the second device. In a peer-to-peer connection the first device and the second device may be connected to each other via the Internet. It should be noted that information can be shared directly between the respective devices without the need of a central server to bridge the communication. The media guidance application may retrieve the access rights for the second device. The access rights allow access to media content or functionality of the second device, and may send the access rights to the first device through the peer-to-peer connection.

In some embodiments, the media guidance application may also prompt the second user with both a first selectable option to transmit the access rights for the second device to the first device, and a second selectable option to block the first device. For example, the media guidance application may generate these options on the display of the second device. In response to receiving a selection of the first selectable option, the media guidance application may transmit the access rights for the second device to the first device. And in response to receiving a selection of the second selectable option, the media guidance application may block the first device from connecting to the second device. For example, the media guidance application may create a firewall that blocks communications from the first device.

It should be noted that in the examples given previously, the processing for the determination of values such as likelihood, degree of interaction, etc., can be performed by the media guidance application on various devices. For example, the media guidance application may perform the processing on the first device, the second device, a remote server, or a different device owned by the first or second user. For example, if the first user wishes to connect his smartphone to a smart speaker owned by the second user, the selectable options on whether to allow the first device to connect to the second device, may be displayed on a smartphone owned by the second user. In this embodiment, a peer-to-peer network connection may be established between the smart speaker and the smartphone of the second user. When the smart speaker receives a discovery message, the smart speaker may forward the information in the discovery message to the smartphone of the second user. Thus, if multiple devices in the environment respond to the discovery message of the first device, each device will not perform the same calculations and waste processing. This allows all of the processing and decision-making of the media guidance application to take place on a single device that can perform calculations quickly, or has access to additional information about the interactions of the second user. For example, a smart TV of the second user may not have access to the social media interactions of the second user (e.g., the second user did not log on to their social media account on the smart TV). Therefore, the determination of the degree of interaction is more efficiently performed on a device, such as the smartphone of the second user, which has access to the interaction data associated with the social media account.

Alternatively, the processing may be divided across all devices in the environment. For example, the environment may include three devices of the second user: a smart speaker, a smart TV, and a smartphone. A peer-to-peer network may connect all three devices. Each device may hold exclusive profile information of the second user. For example, the smart speaker may hold audio samples of the second user speaking to the first user on various occasions. The audio samples may not be accessible on other devices, but may still be considered electronic communications because they are digital copies of communication between the respective users. Similarly, the smart TV may be accompanied by an external camera (e.g., a Microsoft Kinect) or an embedded camera that may have stored videos of the first user and the second user watching the smart TV together. Once again, the stored videos may not be accessible on other devices, but may still be considered electronic communication because they are digital copies of an interaction between the first user and the second user. Thus, each device may determine a unique degree of interaction, a unique likelihood, etc., using the steps described previously, and may share the outputs (e.g., individual verdicts on whether to transmit the access rights or block the first device) with the devices in the peer-to-peer network. A voting system may then be utilized by the media guidance application to determine a final verdict on whether to transmit the access rights or block the first device (e.g., transmit the access rights if a majority of the devices decide to transmit).

In some aspects of the disclosure, the media guidance application may determine that a first user, carrying a first device (e.g., the first user's laptop) comprising profile information of the first user, has entered an environment of a second user. As previously mentioned, the profile information of the user may include information about the user's preferences, device settings, media viewing history, social media data, usage statistics, calendar, location history, etc. The global positioning system (GPS) on the first device may be used by the media guidance application to determine that the user has entered the environment (e.g., the house of the user's mother).

The media guidance application may determine that a media asset created by the first user (e.g., a photo, video, graphic, audio file, video game, etc.) at a creation time within a threshold period of time from the present time is stored on the first device. Suppose that the first user was previously attending a soccer game and capturing videos of the soccer game. One or more videos may be captured by the first user on the first device (e.g., the laptop) or a different device (e.g., a smartphone). If a video was captured on the different device, the video must be made accessible on the first device. For example, the captured video may be stored on the cloud or may be transferred and stored in the local storage of the first device. The video may also be stored in a device owned by the first user that is not present at the environment (e.g., a set-top box of the first user). The first device may retrieve the video from the set-top box (e.g., via an application on the first device that connects to the set-top box server). The media guidance application may extract the metadata from the video to retrieve information such as the creation location (e.g., where the video was captured), the creation time (e.g., when the video was captured), the media type (e.g., video, photo, audio, etc.), the media format (e.g., mp4, avi, etc.), the content of video (e.g., a soccer game), video name, video size, etc. The threshold period of time from the present time represents a time window within which the media guidance application scans for media assets on the first device. For example, the threshold period of time may be three hours. Accordingly, the media guidance application may search the local and/or network storage of the first device for media assets created between the present time and three hours before the present time, by the first user. The first user may adjust the threshold period of time to alter the range of time the media guidance application searches over for created media assets on the first device. The second user may also set the threshold period of time to limit the sharing to those media assets created within the threshold period of time. Suppose the first user captured the video of the soccer game an hour before the first user arrived at the environment and the threshold period of time is three hours. The media guidance application may determine that the creation time of the video is within the threshold period of time.

The media guidance application may then determine whether the media asset comprises content featuring an individual related to the second user. For example, the media guidance application may determine, from the metadata of the video, all individuals present in the video. Suppose the first user uploaded the video onto a social media platform (e.g., Facebook). The first user may have manually tagged the individuals featured in the captured video. Therefore, the media guidance application may identify a tagged individual and determine whether the individual is related to the second user.

In some embodiments, in order to determine whether the media asset comprises the content featuring the individual related to the second user, the media guidance application may identify, using at least one of object recognition and voice recognition, the individual in the media asset. For example, the media guidance application may implement an image processing algorithm that extracts a frame from the video and performs facial recognition (e.g., via segmentation, classification, etc.) to identify faces in the video. The media guidance application may also implement voice recognition to identify a voice in the video. Suppose the media guidance application identifies images of a girl kicking a soccer ball in the captured video.

In response to identifying the individual, the media guidance application may determine an identifier of the individual using a media guidance database. The media guidance database may be stored in a remote server that is accessible to the first device and the second device. The media guidance database may include information such as recorded calls of the first user and the second user, a list of individuals each user has interacted with, reference images of the respective individuals (e.g., retrieved from social media profiles), and identifiers of the respective individuals (e.g., names, usernames, email addresses, phone numbers). In the case that the media guidance application identifies images of an individual in the captured video of the soccer game, the media guidance application may compare the identified images with the reference images in the media guidance database. If the media guidance application finds an image match (e.g., via image processing techniques such as keypoint matching, coefficient of correlation, etc.), the media guidance application may determine an identifier of the individual (e.g., the name of the individual) based on the individual's social media profile information. In the case that the media guidance application extracts an audio clip of a voice in the captured video, the media guidance application may compare the frequency and temporal information of the voice to the frequency and temporal information of the voices in the recorded calls in the media guidance database. If the media guidance application finds a match, the media guidance application may determine the identifier of the individual based on the contact information associated with the call (e.g., identify who was called). Suppose that the media guidance application determines, in response to finding a facial match in the media guidance database, that the girl kicking the soccer ball is named Lisa Simpson.

In response to determining the identifier of the individual, the media guidance application may search the interaction data of the second user for the identifier. For example, the media guidance application may search for the identifier "Lisa Simpson" in the contact list and/or social media friends list of the second user. In response to determining that the identifier of the individual is in the interaction data of the second user, the media guidance application may determine that the individual is related to the second user. For example, the media guidance application may determine that Lisa Simpson is listed in the contact information of the second user and therefore is related to the second user (e.g., as an acquaintance, coworker, friend, etc.). In some embodiments, the media guidance application may search for a formal relationship between the individual and the second user. For example, the media guidance application may retrieve the entry "Lisa Simpson" in the contact information or social media friends list, and determine that Lisa Simpson is described as the second user's granddaughter.

In response to determining that the media asset comprises the content featuring the individual related to the second user, the media guidance application may transmit a discovery message to identify devices in the environment. The payload of the discovery message may include information of the first device, an identifier of the first user, and may specify that the first device has access to the media asset that features the individual related to the second user. The media guidance application may then identify a second device in the environment based on the discovery message. For example, a second device (e.g., a smart TV) in the environment may receive the discovery message. In response, the second device may send an acknowledgment message to the first device. The acknowledgment message may include information about the device such as a device identifier (e.g., name), a device type (e.g., multimedia system, phone, display, etc.), authorized users, etc., and timestamps signifying when the discovery message was received and when the acknowledgment was transmitted.

The media guidance application may then determine that the second user is authorized to grant access rights for the second device. For example, the media guidance application may parse the acknowledgment message to determine a list of authorized users who may grant access rights for the second device. The access rights may be a digital key, or a set of digital keys, that allows a device to connect to the second device in order to send and/or receive data (e.g., media content), and/or utilize a functionality of the second device (e.g., the ability to display video or output audio). Without the access rights (e.g., the digital key), the second device may at most send an acknowledgement message to the first device in response to receiving the discovery message. However, additional messages requesting data such as media content may be blocked by the second device.

The media guidance application may receive, at the second device, a request from the first device to connect and generate for display, on the second device, the media asset. For example, the first user may initiate the request at the first device in order to share the video of the soccer game featuring the second user's granddaughter. In some embodiments, the media guidance application may determine a length of the media asset. Depending on the type of media asset (e.g., video, photo, audio, electronic book, etc.), the length of the media asset can be described in various ways. For example, the length of a video may be measured in the number of frames in the video or the duration of the video. Similarly, a slideshow may be measured in the number of images in the slideshow or the duration of the slideshow. Suppose the media guidance application determines that the captured video of the soccer game has a length of one minute.

The media guidance application may determine an amount of time that the individual is featured in the content of the media asset, with respect to the length of the media asset. For example, the media guidance application may determine that the individual is present in the video for 20 seconds (e.g., either through voice or visuals). Suppose the length of the media asset was measured in frames (e.g., 1000 frames). It should be noted that the amount of time that the individual is featured in the content of the media asset may also be measured by the number of frames (e.g., 333 frames). Similarly, if the media asset is a photo album of 100 photos, the amount of time the individual is featured may be measured by the number of photos featuring the individual (e.g., 33 photos). In each example, relative to the length of the media asset, the amount of time the user is present is approximately 33%. The media guidance application may then determine whether the amount of time is greater than a prominence threshold. In response to determining that the amount of time is greater than the prominence threshold, the media guidance application may automatically initiate the request at the first device to connect and generate for display, on the second device, the media asset. This process of determining that prominence of the individual may be implemented before the first device transmits the discovery message. The first device may also transmit the amount of time the individual is featured in the media asset in the discovery message. In some embodiments, the media guidance application may simply determine that the individual is present in the content, irrespective of prominence.

The media guidance application may then retrieve interaction data of the individual and the second user. Interaction data may include any information indicating communication between the individual and the second user, during a period of time. Interaction data may include, but is not limited to, call logs, social media posts, messages, shared location history, emails, etc. The interaction data may also list all users the second user has interacted with during the period of time.

The media guidance application may then determine a degree of interaction between the individual and the second user, based on the interaction data. In some embodiments, the media guidance application may determine the degree of interaction between the individual and the second user by first determining, based on the interaction data, a communication frequency of electronic communications, between the individual and the second user. Electronic communications include, but are not limited to, voice calls, video chats, social media posts, messages, emails, etc. Based on the communication frequency, the media guidance application may determine the degree of interaction. For example, the media guidance application may identify, from the interaction data, the electronic communications exchanged between the individual and the second user in a period of time. Suppose the electronic communications between the second user and the granddaughter of the second user include text messages.

The media guidance application may then determine a set of electronic communications. The set of electronic communications may include electronic communications whose respective lengths are greater than a length threshold. The length threshold may be a preset value determined by the second user, representing a minimum length of an electronic communication to be considered significant. For example, exchanged text messages that only featured five words may not be considered significant communication. Accordingly, the length threshold for textual electronic communications may be 20 words. The media guidance application may then determine a number of electronic communications in the set of electronic communications. Suppose a total of thirty text messages are originally retrieved. Based on the length threshold, the media guidance application may determine that ten text messages feature at least 20 words. Based on the number of electronic communications, the media guidance application may determine the communication frequency (e.g., daily, weekly, annually, etc.). For example, the media guidance application may determine that based on a span of ten days, the communication frequency is one electronic communication per day.

The media guidance application may then determine a likelihood that the second user will grant the access rights for the second device to the first user in order to view the media asset, based on the degree of interaction and the creation time of the media asset. The likelihood may also be a quantitative or qualitative value representing a probability that the second user will or will not grant the access rights for the second device to the first user. It should be noted that the threshold period of time may be a long period of time (e.g., one year). Accordingly, a captured video of a soccer game that was created seven months before the present time may not be as relevant to the second user as a captured video of a soccer game that was created two days before the present time. Alternatively, the threshold period of time may be the amount of time that has passed since the first user and the second user previously interacted, or the amount of time that has passed since the first device and a device owned by the second user last connected. For example, if the respective users met two weeks prior, the threshold period of time may be two weeks and all media within the two-week period may be relevant for sharing amongst the two users.

In some embodiments when determining the likelihood that the second user will grant the access rights for the second device to the first user, the media guidance application may retrieve a connection history of the second device that lists previous devices and their respective users that have either been granted or denied access rights to the second device. For example, the connection history may list three entries, each comprising a timestamp at which a connection between a device and the second device was requested (e.g., 3/1/18 10:23:11 pm), an identifier of the device (e.g., "smartphone"), an identifier of the user of the device (e.g., "Bart Simpson"), additional details about the connection (e.g., an identifier of the individual in the media asset, calculated likelihood, degree of interaction, creation time of media asset, etc.), and a determination by the second user on whether to grant access rights (e.g., granted/denied).

The media guidance application may generate a probabilistic model that estimates likelihoods using, as training data, respective degrees of interaction and creation times associated with the respective users that have either been granted or denied access rights to the second device. For example, the media guidance application may utilize machine learning and/or deep learning algorithms (e.g., regression, classification) to determine the likelihood. The media guidance application may use the labeled entries from the connection history as training data to create a probabilistic model that is a function of the degree of interaction and the creation time of the media asset. The media guidance application may then estimate, using the probabilistic model, the likelihood based on the degree of interaction and the creation time. For example, if the degree of interaction is 40% and the creation time is one hour before the present time, the probabilistic model may output an estimate of 70%. This likelihood suggests that there is a 70% chance that the second user would grant access rights to the first device, given the approvals/blocks the second user has established in the past.

In some embodiments, the media guidance application may additionally generate a probabilistic model using the type of media (e.g., photos, videos, audio files, etc.) previously shared across devices as training data. For example, the media guidance application may determine that various users have attempted to share a total of 100 photos with the second user. Of the 100, 70 photos were successfully granted access rights for and shared. As a result, the media guidance application may determine that there is a 70% chance that the second user will grant access rights for photos. This percentage may then be used as an additional parameter when determining whether to grant access rights to the first device (e.g., whether the media asset the first user wishes to share is a type of media the second user prefers).

The media guidance application may then, in response to determining that the likelihood is greater than a threshold, transmit the access rights for the second device to the first device. Analogous to the second user deciding on whether to grant access rights for the second device to the first user, the media guidance application uses the threshold as a decision boundary to determine whether to transmit the access rights to the first user. Accordingly, the threshold may be a preset value set by the second user. If the second user assigns a higher threshold, receiving access rights from the second device may require a greater likelihood. As a result, the individual may need to interact more with the second user, or the creation time may need to be closer to the present time. Suppose the threshold is 65%. Because the likelihood (e.g., 70%) is greater than the threshold, the media guidance application may grant access rights for the second device to the first device.

In some embodiments, when transmitting the access rights for the second device to the first device, the media guidance application may determine that the likelihood is less than a second threshold associated with a second level of access to the second device. In this case, suppose that the threshold is a first threshold associated with a first level of access to the second device and that the second level of access is greater than the first level of access. Each level of access may be associated with the ability to send and/or receive messages, an ability to access content, and/or access to some functionality of the second device. For example, the first level of access may allow the first device to send and/or receive messages from the second device. Thus, the two respective devices may share information. The second level of access may allow the first device to utilize a functionality of the second device such as the ability to use the display screen of the second device. Each subsequent level of access may include all access rights from the previous level of access, along with additional access rights. Accordingly, each level of access may have its own threshold (e.g., 30%, 40%, etc.).

In response to determining that the likelihood is less than the second threshold, the media guidance application may transmit the access rights associated with the first level of access for the second device to the first device and restrict the first device from the access rights associated with the second level of access. As discussed in the previous example, the media guidance application may determine that the likelihood (e.g., 70%) is greater than the first threshold (e.g., 65%). If the second threshold has a value of 80%, the media guidance application may determine that the likelihood is less than the second threshold. In response, the media guidance application may restrict the first device from the access rights associated exclusively with the second level of access, and may grant access rights to the first device that are associated with the first level of access.

In some embodiments, when transmitting the access rights for the second device to the first device, the media guidance application may automatically establish a peer-to-peer connection between the first device and the second device. In a peer-to-peer connection, the first device and the second device may be connected to each other via the Internet. It should be noted that information can be shared directly between the respective devices without the need of a central server to bridge the communication. The media guidance application may retrieve the access rights for the second device which allow access to media content or functionality of the second device, and may send the access rights to the first device through the peer-to-peer connection.

In some embodiments, the media guidance application may automatically transmit the access rights for the second device to the first device in response to determining that the individual has entered the environment. For example, if the granddaughter of the second user enters the environment, and the media guidance application determines that the captured video of the soccer game features the granddaughter of the second user (i.e., the individual in the media asset is related to the second user), the media guidance application may automatically transmit access rights to the first device.

In some embodiments, the media guidance application may automatically transmit the access rights for the second device to the first device in response to detecting speech, from the second user, referencing the content of the media asset. Suppose that the second user speaks to the first user and asks, "how was the soccer game?". The media guidance application may detect the voice of the second user and identify, using voice recognition and audio clip references from the media guidance database, that the voice is of the second user. Furthermore, the metadata of the media asset may include an identifier "soccer game," which may be determined by using objection recognition on a frame of the media asset, or by the name and/or description of the media asset. The media guidance application may determine that the second user referenced the identifier of the media asset and may automatically transmit the access rights, prior to determining the degree of interaction between the individual and the second user. Alternatively, the second user may ask, "how is my granddaughter?". In this scenario, the media guidance application may determine that the media asset features the granddaughter of the second user. In response, the media guidance application may automatically transmit the access rights for the second device, to the first device.

The media guidance application may then generate for display the media asset on the second device. For example, the media guidance application may send the media asset to the second device via the peer-to-peer connection. The media guidance application may then generate for display the media asset on the second device.

In some embodiments, in response to determining that the first user has been granted access rights, the media guidance application may generate an access pass for the first user and transmit the access pass to the first device. The access pass may allow the first user to access the second device during future visits without having the media guidance application re-determine the likelihood of the second user granting access rights to the first user. This may conserve processing power because the media guidance application will not constantly re-determine likelihoods for users that have previously been granted access rights. Furthermore, the access pass may be specific to the first user and/or the first device of the first user. Using encryption methods, the media guidance application may prevent the access pass from being copied and distributed.

In some aspects, the embodiments described above which allow the first user to gain access rights to the second device may be flipped. For example, the media guidance application may determine that a first user carrying a first device has entered an environment of a second user. In response to determining that the first user has entered the environment, the media guidance application may identify a second device of the second user that is attempting to connect and access media stored on the first device. The media guidance application may then determine a likelihood that the first user will grant the access rights for the first device to the second user, based on interaction data between the first user and the second user, and in response to determining that the likelihood is greater than a threshold, the media guidance application may transmit the access rights for the first device to the second device. The first user may also have the ability to deny access to specific media assets stored on the first device.

In summary, for the first aspects discussed, the media guidance application may determine that a first user carrying a first device has entered an environment. In response to determining that the first user has entered the environment, the media guidance application may determine a frequency with which the first user enters the environment. In response to determining that the frequency is above a frequency threshold, the media guidance application may identify a second device in the environment. The media guidance application may further determine that a second user is authorized to grant access rights for the second device. The media guidance application may then determine a likelihood that the second user will grant the access rights for the second device to the first user, based on interaction data between the first user and the second user, and in response to determining that the likelihood is greater than a threshold, the media guidance application may transmit the access rights for the second device to the first device.

In the alternative aspects discussed, the media guidance application may determine that a first user carrying a first device has entered an environment of a second user. The media guidance application may determine that a media asset recently created by the first user is stored on the first device. In response to determining that the media asset comprises of content featuring an individual related to the second user, the media guidance application may identify, in the environment, a second device that the second user is authorized to grant access rights for. The media guidance application may receive, at the second device, a request from the first device to connect and generate for display, on the second device, the media asset. In response to receiving the request, the media guidance application may retrieve interaction data between the individual and the second user and determine a likelihood that the second user will grant the access rights for the second device to the first user in order to view the media asset, based on interaction data. In response to determining that the likelihood is greater than a threshold, the media guidance application may transmit the access rights for the second device to the first device and generate, for display, the media asset on the second device.

It should be noted that the systems, methods, apparatuses, and/or aspects described above may be applied to, or used in accordance with, other systems, methods, apparatuses, and/ or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for seamlessly connecting devices based on relationships between the users of the respective devices, and in some aspects, seamlessly connecting a device to a user's device in order to share and display content featuring an individual closely related to the user.

Suppose that a user enters an environment, such as the home of the user's mother. A media guidance application on the user's smartphone may determine that the user has entered the home and frequently visits (e.g., on a daily basis). In response, the media guidance application may identify other devices in the home (e.g., smart speaker, computer, television, etc.) that may belong to the user's mother. The media guidance application on one of the identified devices (e.g., television) may retrieve interaction data between the user and the user's mother. For example, the media guidance application may refer to phone calls, social media posts, emails, and texts, to determine a degree of interaction between the user and the user's mother. Based on the degree of interaction and how often the user visits the home, the media guidance application on the television may determine to grant and transmit access rights for the television to the user's smartphone.

In an alternate aspect, in response to determining that the user has entered the home of the user's mother, the media guidance application on the user's smartphone may determine that the user has recently captured images of an individual related to the user's mother. For example, recent pictures of the user's daughter may be stored on the user's smartphone. In response to determining that the user's daughter is the granddaughter of the user's mother, the media guidance application on the user's smartphone may send a request to connect to a device in the environment (e.g., a television) in order to share the images. In this example, the media guidance application on the television may retrieve interaction data between the user's daughter and the user's mother to determine a degree of interaction (e.g., how often the user's daughter and user's mother interact). Based on the degree of interaction and how recent the images are, the media guidance application on the television may determine to grant and transmit access rights for the television to the user's smartphone. In response to receiving the access rights, the pictures may be shared and displayed on the television.

Figure 1:
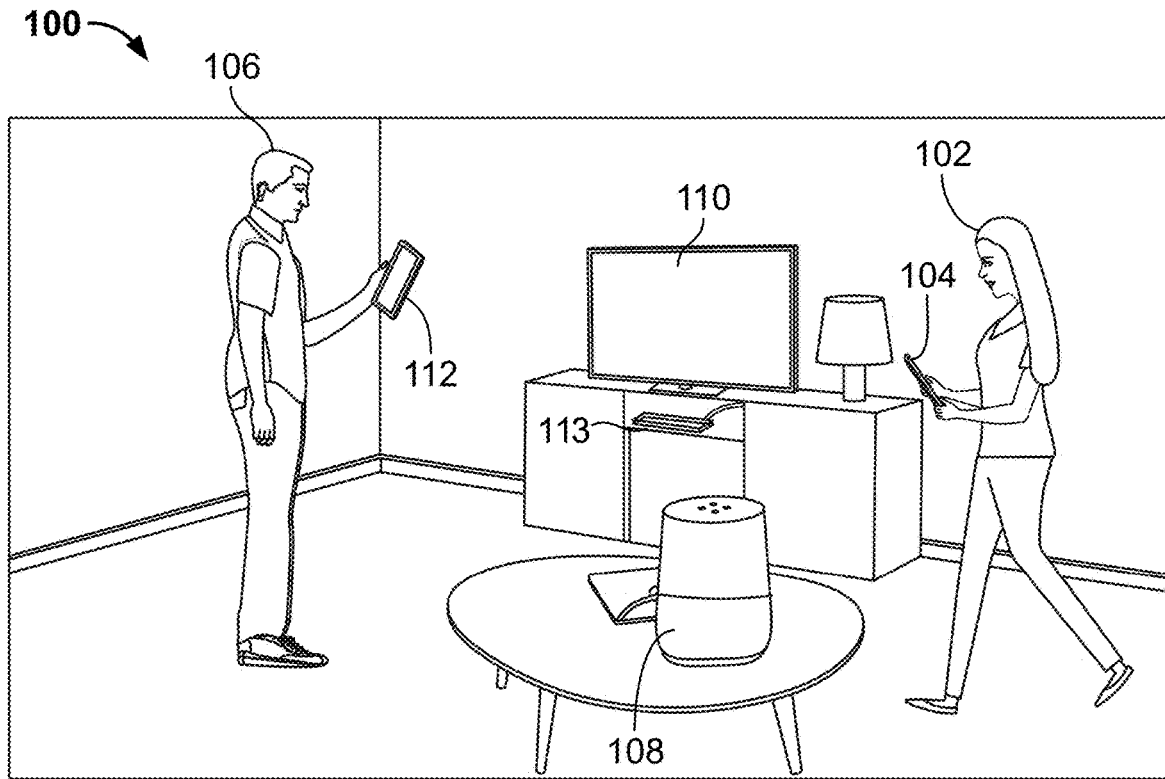
FIG. 1 shows an illustrative example of a scenario for seamlessly connecting devices based on relationships between the users of the respective devices, in accordance with some embodiments of the disclosure.

FIG. 1 shows an illustrative example of a scenario for seamlessly connecting devices based on relationships between the users of the respective devices, in accordance with some embodiments of the disclosure. The media guidance application may be executed by control circuitry on outsider device 104, environment device 108, environment device 110, environment device 112, on a remote server, or a combination of these devices, as will be described with respect to FIGS. 3-6. Environment 100 is a setting where multiple devices owned by User 106 can be found.

As shown in FIG. 1, the media guidance application may determine that User 102, carrying outsider device 104 comprising profile information of User 102, has entered Environment 100. It should be noted that Environment 100 may belong to User 106. Furthermore, outsider device 104 may be the User 102's smartphone. The profile information of User 102 may include information about User 102's preferences, device settings, media viewing history, social media data, usage statistics, calendar, location history, etc. The global positioning system (GPS) on outsider device 104 may be used by the media guidance application to determine that User 102 has entered Environment 100 (e.g., the house of the user's friend).

In some embodiments, the media guidance application may determine, using sensor circuitry, a first location of User 102 and may determine a second location of User 106. The sensor circuitry may be a GPS embedded in outsider device 104 of User 102 that can provide coordinates of User 102. If outsider device 104 is connected to Wi-fi, a triangulation process can be used to determine the relative position of User 102, based on Wi-fi signal strength received from multiple routers in the vicinity. The location of User 106 may also be determined using a GPS embedded in a device of User 106, or Wi-fi triangulation.

The media guidance application may determine that the second location of User 106 corresponds to a location of Environment 100 (e.g., his/her house). For example, if GPS coordinates are determined at the environment device 112 of User 106 and the approximate GPS coordinates of Environment 100 are retrieved (e.g., by determining the address of User 106's house), the media guidance application may determine that the respective GPS coordinates match. Therefore, User 106 may be located in Environment 100. The media guidance application may then determine that the first location of User 102 and the second location of User 106 are within a threshold proximity. The threshold proximity represents a maximum distance or displacement that User 102 can be away from User 106 in order to be considered to be in the same environment. In some embodiments, the threshold proximity may be represented by a circle with a diameter as large as the length of Environment 100 (e.g., 30 feet). In response to determining that the first location and the second location are within the threshold proximity, the media guidance application may thus determine that the first location corresponds to the location of Environment 100.

In some embodiments, the media guidance application may retrieve profile information of User 106. For example, the media guidance application may retrieve the location history of User 106 and contact information. Based on the profile information of User 106, the media guidance application may determine that both Environment 100 and the devices inside Environment 100 are owned by User 106.

The media guidance application on outsider device 104 may, in response to determining that User 102 has entered Environment 100, determine, based on the profile information of User 102, a frequency with which User 102 enters Environment 100. For example, the media guidance application on outsider device 104 may retrieve the location history of User 102. The location history may indicate the number of times User 102 has visited Environment 100. The location history may be divided into periods of time. For example, the media guidance application may determine that the user has entered the house ten times in the past month. Similarly, the media guidance application may determine that the user has entered the house 1000 times since the location history began keeping a record of the user's visits.

The media guidance application may determine whether the frequency is greater than a frequency threshold. In response to determining that the frequency is greater than the frequency threshold, the media guidance application may transmit a discovery message to identify devices in Environment 100. The frequency threshold may be a preset value representing the minimum visits User 102 must make in a period of time (e.g., four visits per month) in order to automatically transmit a discovery message to the devices in Environment 100. The frequency threshold may be retrieved from a media guidance database associated with the media guidance application. User 102 may adjust the frequency threshold to alter how often outsider device 104 may automatically transmit discovery messages. For example, User 102 may increase the frequency threshold. As a result, in order for outsider device 104 to automatically transmit a discovery message, User 102 must enter Environment 100 more frequently. User 106 may also set the frequency threshold such that any user that enters Environment 100 an amount of times less than the frequency threshold may not transmit discovery messages, and if a discovery message is transmitted, the devices in Environment 100 may not respond to the discovery message based on User 106's set frequency threshold. In the example previously given, the frequency of the user is ten visits per month, which is greater than the frequency threshold of four visits per month. Therefore, the media guidance application on outsider device 104 may transmit a discovery message.

The media guidance application may then identify environment device 108 in Environment 100 based on the discovery message. For example, environment device 108 (e.g., a smart speaker) in Environment 100 may receive the discovery message. In response, environment device 108 may send an acknowledgment message to outsider device 104. The acknowledgment message may include information about the device such as a device identifier (e.g., a device name), a device type (e.g., multimedia system, phone, tablet, etc.), authorized users, the location of device in Environment 100, etc., and timestamps signifying when the discovery message was received and when the acknowledgment was transmitted.

The media guidance application on outsider device 104 may then determine that User 106 is authorized to grant access rights for environment device 108. For example, the media guidance application may parse the acknowledgment message to determine a list of authorized users who may grant access rights for environment device 108. The access rights may be a digital key, or a set of digital keys, that allows a device to connect to environment device 108 in order to send and/or receive data (e.g., media content), and/or utilize a functionality of environment device 108 (e.g., the ability to output audio or communicate with other smart devices). Without the access rights (e.g., the digital key), environment device 108 may at most send an acknowledgement message to outsider device 104 in response to receiving the discovery message. However, additional messages requesting data such as media content may be blocked by environment device 108.

The media guidance application on environment device 108 may then retrieve interaction data of User 102 and User 106. Interaction data may include any information indicating communication between User 102 and User 106, during a period of time. Interaction data may include, but is not limited to, call logs, social media posts, messages, shared location history, emails, etc. The interaction data may also list all users User 106 has interacted with during the period of time.

The media guidance application on environment device 108 may determine a degree of interaction between User 102 and User 106 based on the interaction data. The degree of interaction is a quantitative or qualitative value that represent the magnitude (e.g., frequency or amount) of interaction between User 102 and User 106. For example, the degree of interaction may be a fraction or percentage (e.g., 10%) representing the total number of messages exchanged between User 102 and User 106, relative to the total number of messages User 106 has exchanged with all users listed in the interaction data of User 106. The degree of interaction may also be a frequency (e.g., 5 messages per day) representing the number of messages exchanged between User 102 and User 106 in a period of time. In terms of a qualitative value, the degree of interaction may be one of several interaction types (e.g., no interaction, minimal interaction, below average interaction, average interaction, above average interaction, significant interaction, etc.) or interaction frequencies (e.g., rare interaction, occasional interaction, frequent interaction, etc.).

In some embodiments the media guidance application may determine the degree of interaction between User 102 and User 106 by first determining, based on the interaction data, a communication frequency between User 102 and User 106, which represents how often User 102 and User 106 have communicated using electronic communications. Electronic communications include, but are not limited to, voice calls, video chats, social media posts, messages, emails, etc. Based on the communication frequency, the media guidance application may determine the degree of interaction. For example, the media guidance application may identify, from the interaction data, the electronic communications exchanged between User 102 and User 106 in a period of time. Suppose the electronic communications between User 106 and User 102 include text messages exchanged and video chats that both participated in. The media guidance application may determine a length of each electronic communication of the electronic communications exchanged. For example, the length of the text messages may be described by the total number of words used in each of the text messages exchanged and the length of the video chats may be described by the total amount of time both User 106 and User 102 spent talking to one another in their video chats.

The media guidance application may then determine a set of electronic communications that includes electronic communications whose respective lengths are greater than a length threshold. The length threshold may be a preset value determined by User 106, representing a minimum length of an electronic communication to be considered significant. For example, exchanged text messages that only featured five words may not be considered significant communication. Accordingly, the length threshold for textual electronic communications may be 20 words. Similarly, the length threshold for a video chat may be five minutes. The media guidance application may then determine a number of electronic communications in the set of electronic communications. Suppose a total of thirty text messages and ten logs of video chats of a span of ten days are originally retrieved. Based on the length threshold, the media guidance application may determine that ten text messages feature at least 20 words and four logs feature video chats that lasted at least five minutes. In this example, multiple types of electronic communications are considered. In some embodiments, the media guidance application may apply various weights to each type of electronic communication. For example, the media guidance application may weigh video chats ten times greater than text messages because video chats are more interactive than text messages. Accordingly, the total number of electronic communications may be weighted as fifty electronic communications (e.g., 10 text messages+4 logs of video chats multiplied by 10). Based on the number of electronic communications, or the weighted number of electronic communications, the media guidance application may determine the communication frequency (e.g., daily, weekly, annually, etc.). For example, the media guidance application may determine that based on a span of ten days, the communication frequency using the weight electronic communications is five electronic communications per day.

The media guidance application may then determine a likelihood that User 106 will grant the access rights for environment device 108 to User 102, based on the degree of interaction and the frequency. The likelihood may also be a quantitative (e.g., 30%, 40%, etc.) or qualitative (e.g., "not likely," "likely," "very likely," etc.) value representing a probability that User 106 will or will not grant the access rights for environment device 108 to User 102. The threshold represents a minimum likelihood required to transmit the access rights. Thus, in response to determining that the likelihood is greater than a threshold, the media guidance application may transmit the access rights for environment device 108 to outsider device 104.

In some embodiments when determining the likelihood that User 106 will grant the access rights for environment device 108 to User 102, the media guidance application may retrieve a connection history of environment device 108 that lists previous devices and their respective users that have either been granted or denied access rights to environment device 108. For example, the connection history may list three entries, each comprising a timestamp at which a connection between a device and environment device 108 was requested (e.g., 3/1/18 10:23:11 pm), an identifier of the device (e.g., "smartphone"), an identifier of the user of the device (e.g., "Bart Simpson"), additional details about the connection (e.g., the frequency of visits of the respective user, calculated likelihood, degree of interaction, etc.), and a determination by User 106 on whether to grant access rights (e.g., granted/denied).

The media guidance application on environment device 108 may generate a probabilistic model that estimates likelihoods using, as training data, respective degrees of interaction and frequencies associated with the respective users that have either been granted or denied access rights to environment device 108. For example, the media guidance application may utilize machine learning and/or deep learning algorithms (e.g., regression, classification) to determine the likelihood. The media guidance application may use the labeled entries from the connection history as training data to create a probabilistic model that is a function of the degree of interaction and the frequency. The media guidance application may then estimate, using the probabilistic model, the likelihood based on the degree of interaction and the frequency. For example, if the degree of interaction is 40% and the frequency is ten visits per month, the probabilistic model may output an estimate of 70%. This likelihood suggests that there is a 70% chance that User 106 would grant access rights to outsider device 104, given the approvals/blocks User 106 has established in the past.

Analogous to User 106 deciding on whether to grant access rights for environment device 108 to User 102, the media guidance application uses the threshold as a decision boundary to determine whether to transmit the access rights to User 102. Accordingly, the threshold may be a preset value set by User 106. If User 106 assigns a higher threshold, receiving access rights from environment device 108 may require a greater likelihood. As a result, User 102 may need to interact more with User 106, or the frequency of visits may need to be higher. Suppose the threshold is 65%. Because the likelihood (e.g., 70%) is greater than the threshold, the media guidance application may grant access rights for environment device 108 to outsider device 104.

In some embodiments, when transmitting the access rights for environment device 108 to outsider device 104, the media guidance application may determine that the frequency is less than a second frequency threshold associated with a second level of access to environment device 108. In this case, suppose that the frequency threshold is a first frequency threshold associated with a first level of access to environment device 108 and that the second level of access is greater than the first level of access. Each level of access may be associated with the ability to send and/or receive messages, an ability to access content, and/or access to some functionality of environment device 108. For example, the first level of access may allow outsider device 104 to send and/or receive messages from environment device 108. Thus, the two respective devices may share information. The second level of access may allow outsider device 104 to utilize a functionality of environment device 108 such as the ability to use the display screen of environment device 108. Each subsequent level of access may include all access rights from the previous level of access, along with additional access rights. Accordingly, each level of access may have its own frequency threshold (e.g., four visits per month, 11 visits per month, 15 visits per month, etc.).

In response to determining that the frequency is less than the second frequency threshold, the media guidance application may transmit the access rights associated with the first level of access for environment device 108 to outsider device 104 and restrict outsider device 104 from the access rights associated with the second level of access. As discussed in the previous example, the media guidance application may determine that the frequency (e.g., ten visits per month) is greater than the first frequency threshold (e.g., four visits per month). If the second frequency threshold has a value of 11 visits per month, the media guidance application may determine that the frequency is less than the second frequency threshold. In response, the media guidance application may restrict outsider device 104 from the access rights associated exclusively with the second level of access, and may grant access rights to outsider device 104 that are associated with the first level of access.

In some embodiments, when transmitting the access rights for environment device 108 to outsider device 104, the media guidance application may determine, based on the profile information of User 102, that an event is occurring in Environment 100 in which both User 102 and User 106 are participants. For example, the media guidance application of outsider device 104 may retrieve a calendar of User 102. The calendar may list an event that is to take place during the time User 102 visits Environment 100. Suppose that the event is a birthday party. The media guidance application may determine that both User 102 and User 106 are going to participate in the event (e.g., User 106 may have invited User 102, or both users may have accepted an invitation). User 102 may want to connect his/her smartphone to a smart speaker of User 106 to share and play songs on the smart speaker. In response to determining that the event is occurring in Environment 100, the media guidance application may transmit the access rights for environment device 108 to outsider device 104.

In some embodiments, when transmitting the access rights for environment device 108 to outsider device 104, the media guidance application may automatically establish a peer-to-peer connection between outsider device 104 and environment device 108. In a peer-to-peer connection outsider device 104 and environment device 108 may be connected to each other via the Internet. It should be noted that information can be shared directly between the respective devices without the need of a central server to bridge the communication. The media guidance application may retrieve, for environment device 108, the access rights that allow access to media content or functionality of environment device 108, and may send the access rights to outsider device 104 through the peer-to-peer connection.

In some embodiments, the media guidance application may also prompt User 106 with both a first selectable option to transmit the access rights for environment device 108 to outsider device 104, and a second selectable option to block outsider device 104. For example, the media guidance application may generate these options on the display of environment device 112. In response to receiving a selection of the first selectable option, the media guidance application may transmit the access rights for environment device 108 to outsider device 104. And in response to receiving a selection of the second selectable option, the media guidance application may block outsider device 104 from connecting to environment device 108. For example, the media guidance application may create a firewall that blocks communications from outsider device 104.

It should be noted that in the examples given previously, the processing for the determination of values such as likelihood, degree of interaction, etc., can be performed by the media guidance application on various devices. For example, the media guidance application may perform the processing on outsider device 104, environment device 108, a remote server, or a different device owned by the first or second user. For example, if User 102 wishes to connect his/her outsider device 104 (e.g., a smartphone) to environment device 108 (e.g., a smart speaker) owned by User 106, the selectable options on whether to allow outsider device 104 to connect to environment device 108, may instead be displayed on environment device 112 (e.g., a smartphone owned by User 106). In this embodiment, a peer-to-peer network connection may be established between environment device 108 and environment device 112. When environment device 108 receives a discovery message, environment device 108 may forward the information in the discovery message to environment device 112. Thus, if multiple devices in Environment 100 respond to the discovery message of outsider device 104, each device will not perform the same calculations and waste processing. This allows all processing and decision-making of the media guidance application to take place on a single device (e.g., environment device 112) that can perform calculations quickly, or has access to additional information about the interactions of User 106. For example, environment device 110 (e.g., a smart TV) may not have access to the social media interactions of User 106 (e.g., User 106 did not log on to their social media account on the smart TV). Therefore, the determination of the degree of interaction is more efficiently performed on a device, such as environment device 112, which has access to the interaction data associated with the social media account.

In some embodiments, there may exist a dedicated device such as digital media adapter 113 that receives connection requests from outsider device 104, responds to the discovery message, performs the processing necessary to determine the likelihood of granting access to various environment devices, and enables connection(s) between outside device 104 and environment device(s). The digital media adapter 113 may serve as a security measure that prevents direct access to the environment devices from untrusted users and may also determine the most appropriate devices in the environment for performing the actions outsider device 104 may seek to perform. For example, if the outsider device 104 will transmit a song for sharing purposes, the media guidance application on digital media adapter 113 may forward the song to environment device 108 (e.g., a smart speaker).

Alternatively, the processing may be divided across all devices in Environment 100. For example, Environment 100 may include three devices of User 106: environment device 108 (e.g., a smart speaker), environment device 110 (e.g., a smart TV), and environment device 112 (e.g., a smartphone). A peer-to-peer network may connect all three devices. Each device may hold exclusive profile information of User 106. For example, environment device 108 may hold audio samples of User 106 speaking to User 102 on various occasions. The audio samples may not be accessible on other devices, but may still be considered electronic communications because they are digital copies of communication between the respective users. Similarly, environment device 110 may be accompanied by an external camera (e.g., a Microsoft Kinect) or an embedded camera that may have stored videos of User 102 and User 106 watching the smart TV together. Once again, the stored videos may not be accessible on other devices, but may still be considered electronic communication because they are digital copies of an interaction between User 102 and User 106. Thus, each device may determine a unique degree of interaction, a unique likelihood, etc., using the steps described previously, and may share the outputs (e.g., individual verdicts on whether to transmit the access rights or block outsider device 104) with the devices in the peer-to-peer network. A voting system may then be utilized by the media guidance application on environment device 108 to determine a final verdict on whether to transmit the access rights or block outsider device 104 (e.g., transmit the access rights if a majority of the devices decide to transmit).

Figure 2:
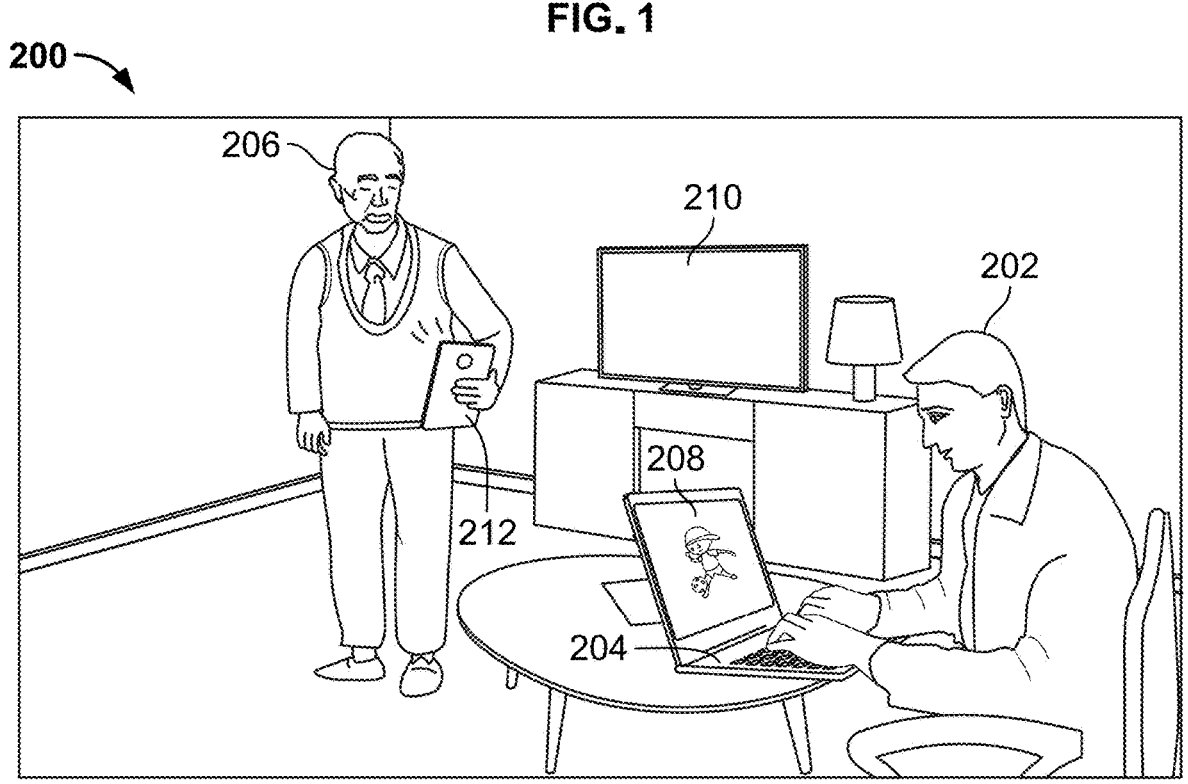
FIG. 2 shows an illustrative example of a scenario for seamlessly connecting to a user's device in order to share and display a media asset featuring an individual closely related to the user, in accordance with some embodiments of the disclosure.

FIG. 2 shows an illustrative example of a scenario for seamlessly connecting to a user's device in order to share and display a media asset featuring an individual closely related to the user, in accordance with some embodiments of the disclosure. The media guidance application may be executed by control circuitry on outsider device 204, environment device 210, environment device 212, on a remote server, or a combination of these devices, as will be described with respect to FIGS. 3-6. Environment 200 is a setting where multiple devices owned by User 206 can be found.

As shown in FIG. 2, the media guidance application may determine that a first user (e.g., User 202), carrying a first device (e.g., outsider device 204) comprising profile information of User 202, has entered an environment of a second user (e.g., User 206). Outsider device 204 may be a laptop. As previously mentioned, the profile information of User 202 may include information about the User 202's preferences, device settings, media viewing history, social media data, usage statistics, calendar, location history, etc. The global positioning system (GPS) on outsider device 204 may be used by the media guidance application to determine that the user has entered Environment 200 (e.g., the house of the user's father).

The media guidance application on outsider device 204 may determine that a media asset (e.g., Media 208) created by User 202 (e.g., a photo, video, graphic, audio file, video game, etc.) at a creation time within a threshold period of time from the present time is stored on outsider device 204. Suppose that User 202 was previously attending a soccer game and capturing videos of the soccer game. One or more videos may be captured by User 202 on outsider device 204 (e.g., the laptop) or a different device (e.g., a smartphone). If a video was captured on the different device, the video must be made accessible on outsider device 204. For example, the captured video may be stored on the cloud or may be transferred and stored in the local storage of outsider device 204. The media guidance application may extract the metadata from the video to retrieve information such as the creation location (e.g., where the video was captured), the creation time (e.g., when the video was captured), the media type (e.g., video, photo, audio, etc.), the media format (e.g., mp4, avi, etc.), the content of video (e.g., a soccer game), video name, video size, etc. The threshold period of time from the present time represents a time window within which the media guidance application scans for media assets on outsider device 204. For example, the threshold period of time may be three hours. Accordingly, the media guidance application may search the local and/or network storage of outsider device 204 for media assets created between the present time and three hours before the present time, by User 202. User 202 may adjust the threshold period of time to alter the range of time the media guidance application searches over for created media assets on outsider device 204. User 206 may also set the threshold period of time to limit the sharing to those media assets created within the threshold period of time. Suppose User 202 captured the video of the soccer game an hour before User 202 arrived at Environment 200 and the threshold period of time is three hours. The media guidance application may determine that the creation time of the video is within the threshold period of time.

The media guidance application on outsider device 204 may then determine whether the media asset comprises content featuring an individual related to User 206. For example, the media guidance application may determine, from the metadata of the video, all individuals present in the video. Suppose User 202 uploaded the video onto a social media platform (e.g., Facebook). User 202 may have manually tagged the individuals featured in the captured video. Therefore, the media guidance application may identify a tagged individual and determine whether the individual is related to User 206.

In some embodiments, in order to determine whether the media asset comprises the content featuring the individual related to User 206, the media guidance application may identify, using at least one of object recognition and voice recognition, the individual in the media asset. For example, the media guidance application may implement an image processing algorithm that extracts a frame from the video and performs facial recognition (e.g., via segmentation, classification, etc.) to identify faces in the video. The media guidance application may also implement voice recognition to identify a voice in the video. Suppose the media guidance application identifies images of a girl kicking a soccer ball in the captured video.

In response to identifying the individual, the media guidance application may determine an identifier of the individual using a media guidance database. The media guidance database may be stored in a remote server that is accessible to outsider device 204 and environment device 210. The media guidance database may include information such as recorded calls of User 202 and User 206, a list of individuals each user has interacted with, reference images of the respective individuals (e.g., retrieved from social media profiles), and identifiers of the respective individuals (e.g., names, usernames, email addresses, phone numbers). In the case that the media guidance application identifies images of an individual in the captured video of the soccer game, the media guidance application may compare the identified images with the reference images in the media guidance database. If the media guidance application finds an image match (e.g., via image processing techniques such as keypoint matching, coefficient of correlation, etc.), the media guidance application may determine an identifier of the individual (e.g., the name of the individual) based on the individual's social media profile information. In the case that the media guidance application extracts an audio clip of a voice in the captured video, the media guidance application may compare the frequency and temporal information of the voice to the frequency and temporal information of the voices in the recorded calls in the media guidance database. If the media guidance application finds a match, the media guidance application may determine the identifier of the individual based on the contact information associated with the call (e.g., identify who was called). Suppose that the media guidance application determines, in response to finding a facial match in the media guidance database, that the girl kicking the soccer ball is named Lisa Simpson.

In response to determining the identifier of the individual, the media guidance application may search the interaction data of User 206 for the identifier. For example, the media guidance application may search for the identifier "Lisa Simpson" in the contact list and/or social media friends list of User 206. In response to determining that the identifier of the individual is in the interaction data of User 206, the media guidance application may determine that the individual is related to User 206. For example, the media guidance application may determine that Lisa Simpson is listed in the contact information of User 206 and therefore is related to User 206 (e.g., as an acquaintance, co-worker, friend, etc.). In some embodiments, the media guidance application may search for a formal relationship between the individual and User 206. For example, the media guidance application may retrieve the entry "Lisa Simpson" in the contact information or social media friends list, and determine that Lisa Simpson is described as User 206's granddaughter.

In response to determining that the media asset comprises the content featuring the individual related to User 206, the media guidance application on outsider device 204 may transmit a discovery message to identify devices in Environment 200. The payload of the discovery message may include information of outsider device 204, an identifier of User 202, and may specify that outsider device 204 has access to the media asset that features the individual related to User 206. The media guidance application may then identify a second device (e.g., environment device 210) in Environment 200 based on the discovery message. For example, environment device 210 (e.g., a smart TV) in Environment 200 may receive the discovery message. In response, environment device 210 may send an acknowledgment message to outsider device 204. The acknowledgment message may include information about the device such as a device identifier (e.g., name), a device type (e.g., multimedia system, phone, display, etc.), authorized users, etc., and timestamps signifying when the discovery message was received and when the acknowledgment was transmitted.

The media guidance application on outsider device 204 may then determine that User 206 is authorized to grant access rights for environment device 210. For example, the media guidance application may parse the acknowledgment message to determine a list of authorized users who may grant access rights for environment device 210. The access rights may be a digital key, or a set of digital keys, that allows a device to connect to environment device 210 in order to send and/or receive data (e.g., media content), and/or utilize a functionality of environment device 210 (e.g., the ability to display video or output audio). Without the access rights (e.g., the digital key), environment device 210 may at most send an acknowledgement message to outsider device 204 in response to receiving the discovery message. However, additional messages requesting data such as media content may be blocked by environment device 210.

The media guidance application may receive, at environment device 210, a request from outsider device 204 to connect and generate for display, on environment device 210, the media asset. For example, User 202 may initiate the request at outsider device 204 in order to share the video of the soccer game featuring User 206's granddaughter. In some embodiments, the media guidance application may determine a length of the media asset. Depending on the type of media asset (e.g., video, photo, audio, electronic book, etc.), the length of the media asset can be described in various ways. For example, the length of a video may be measured in the number of frames in the video or the duration of the video. Similarly, a slideshow may be measured in the number of images in the slideshow or the duration of the slideshow. Suppose the media guidance application determines that the captured video of the soccer game has a length of one minute.

The media guidance application on outsider device 204 may determine an amount of time that the individual is featured in the content of the media asset, with respect to the length of the media asset. For example, the media guidance application may determine that the individual is present in the video for 20 seconds (e.g., either through voice or visuals). Suppose the length of the media asset was measured in frames (e.g., 1000 frames). It should be noted that the amount of time that the individual is featured in the content of the media asset may also be measured by the number of frames (e.g., 333 frames). Similarly, if the media asset is a photo album of 100 photos, the amount of time the individual is featured may be measured by the number of photos featuring the individual (e.g., 33 photos). In each example, relative to the length of the media asset, the amount of time the user is present is approximately 33%. The media guidance application may then determine whether the amount of time is greater than a prominence threshold. The prominence threshold determines how significant the individual is in the media asset. For example, if the amount of time the user is featured is 1%, User 206 may not be interested in viewing the media asset. Suppose the frequency threshold is 30%. In response to determining that the amount of time is greater than the prominence threshold, the media guidance application may automatically initiate the request at outsider device 204 to connect and generate for display, on environment device 210, the media asset. This process of determining that prominence of the individual may be implemented before outsider device 204 transmits the discovery message. Outsider device 204 may also transmit the amount of time the individual is featured in the media asset in the discovery message. Accordingly, if the prominence threshold is set User 206, in response to determining that the amount of time is greater than the prominence threshold, environment device 210 may automatically initiate the request to connect to outsider device 204 in order to generate for display the media asset.

The media guidance application on environment device 210 may then retrieve interaction data of the individual and User 206. Interaction data may include any information indicating communication between the individual and User 206, during a period of time. Interaction data may include, but is not limited to, call logs, social media posts, messages, shared location history, emails, etc. The interaction data may also list all users User 206 has interacted with during the period of time.

The media guidance application on environment device 210 may then determine a degree of interaction between the individual and User 206, based on the interaction data. The degree of interaction is a quantitative or qualitative value that represents the magnitude (e.g., frequency or amount) of interaction between User 202 and User 206. For example, the degree of interaction may be a fraction or percentage (e.g., 10%) representing the total number of messages exchanged between User 202 and User 206, relative to the total number of messages User 206 has exchanged with all users listed in the interaction data of User 206. The degree of interaction may also be a frequency (e.g., 5 messages per day) representing the number of messages exchanged between User 202 and User 206 in a period of time. In terms of a qualitative value, the degree of interaction may be one of several interaction types (e.g., no interaction, minimal interaction, below average interaction, average interaction, above average interaction, significant interaction, etc.) or interaction frequencies (e.g., rare interaction, occasional interaction, frequent interaction, etc.).

In some embodiments the media guidance application may determine the degree of interaction between the individual and User 206 by first determining, based on the interaction data, a communication frequency between the individual and User 206. The communication frequency represents how often the individual and User 206 have communicated using electronic communications. Electronic communications include, but are not limited to, voice calls, video chats, social media posts, messages, emails, etc. Based on the communication frequency, the media guidance application may determine the degree of interaction. For example, the media guidance application may identify, from the interaction data, the electronic communications exchanged between the individual and User 206 in a period of time. Suppose the electronic communications between User 206 and the granddaughter of User 206 include text messages.

The media guidance application may then determine a set of electronic communications that includes electronic communications whose respective lengths are greater than a length threshold. The length threshold may be a preset value determined by User 206, representing a minimum length of an electronic communication to be considered significant. For example, exchanged text messages that only featured five words may not be considered significant communication. Accordingly, the length threshold for textual electronic communications may be 20 words. The media guidance application may then determine a number of electronic communications in the set of electronic communications. Suppose a total of thirty text messages are originally retrieved. Based on the length threshold, the media guidance application may determine that ten text messages feature at least 20 words. Based on the number of electronic communications, the media guidance application may determine the communication frequency (e.g., daily, weekly, annually, etc.). For example, the media guidance application may determine that based on a span of ten days, the communication frequency is one electronic communication per day.

The media guidance application on environment device 210 may then determine a likelihood that User 206 will grant the access rights for environment device 210 to User 202 in order to view the media asset, based on the degree of interaction and the creation time of the media asset. The likelihood may also be a quantitative or qualitative value representing a probability that User 206 will or will not grant the access rights for environment device 210 to User 202. It should be noted that the threshold period of time may be a long period of time (e.g., one year). Accordingly, a captured video of a soccer game that was created seven months before the present time may not be as relevant to User 206 as a captured video of a soccer game that was created two days before the present time.

In some embodiments when determining the likelihood that User 206 will grant the access rights for environment device 210 to User 202, the media guidance application may retrieve a connection history of environment device 210 that lists previous devices and their respective users that have either been granted or denied access rights to environment device 210. For example, the connection history may list three entries, each comprising a timestamp at which a connection between a device and environment device 210 was requested (e.g., 3/1/18 10:23:11 pm), an identifier of the device (e.g., "smartphone"), an identifier of the user of the device (e.g., "Bart Simpson"), additional details about the connection (e.g., an identifier of the individual in the media asset, calculated likelihood, degree of interaction, creation time of media asset, etc.), and a determination by User 206 on whether to grant access rights (e.g., granted/denied).

The media guidance application may generate a probabilistic model that estimates likelihoods using, as training data, respective degrees of interaction and creation times associated with the respective users that have either been granted or denied access rights to environment device 210. For example, the media guidance application may utilize machine learning and/or deep learning algorithms (e.g., regression, classification) to determine the likelihood. The media guidance application may use the labeled entries from the connection history as training data to create a probabilistic model that is a function of the degree of interaction and the creation time of the media asset. The media guidance application may then estimate, using the probabilistic model, the likelihood based on the degree of interaction and the creation time. For example, if the degree of interaction is 40% and the creation time is one hour before the present time, the probabilistic model may output an estimate of 70%. This likelihood suggests that there is a 70% chance that User 206 would grant access rights to outsider device 204, given the approvals/blocks User 206 has established in the past.

The media guidance application may then, in response to determining that the likelihood is greater than a threshold, transmit the access rights for environment device 210 to outsider device 204. The threshold represents a minimum likelihood required to transmit the access rights. Analogous to User 206 deciding on whether to grant access rights for environment device 210 to User 202, the media guidance application uses the threshold as a decision boundary to determine whether to transmit the access rights to User 202. Accordingly, the threshold may be a preset value set by User 206. If User 206 assigns a higher threshold, receiving access rights from environment device 210 may require a greater likelihood. As a result, the individual may need to interact more with User 206, or the creation time may need to be closer to the present time. Suppose the threshold is 65%. Because the likelihood (e.g., 70%) is greater than the threshold, the media guidance application may grant access rights for environment device 210 to outsider device 204.

In some embodiments, when transmitting the access rights for environment device 210 to outsider device 204, the media guidance application may determine that the likelihood is less than a second threshold associated with a second level of access to environment device 210. In this case, suppose that the threshold is a first threshold associated with a first level of access to environment device 210 and that the second level of access is greater than the first level of access. Each level of access may be associated with the ability to send and/or receive messages, an ability to access content, and/or access to some functionality of environment device 210. For example, the first level of access may allow outsider device 204 to send and/or receive messages from environment device 210. Thus, the respective devices may share information. The second level of access may allow outsider two device 204 to utilize a functionality of environment device 210 such as the ability to use the display screen of environment device 210. Each subsequent level of access may include all access rights from the previous level of access, along with additional access rights. Accordingly, each level of access may have its own threshold (e.g., 30%, 40%, etc.).

In response to determining that the likelihood is less than the second threshold, the media guidance application may transmit the access rights associated with the first level of access for environment device 210 to outsider device 204 and restrict outsider device 204 from the access rights associated with the second level of access. As discussed in the previous example, the media guidance application may determine that the likelihood (e.g., 70%) is greater than the first threshold (e.g., 65%). If the second threshold has a value of 80%, the media guidance application may determine that the likelihood is less than the second threshold. In response, the media guidance application may restrict outsider device 204 from the access rights associated exclusively with the second level of access, and may grant access rights to outsider device 204 that are associated with the first level of access.

In some embodiments, when transmitting the access rights for environment device 210 to outsider device 204, the media guidance application may automatically establish a peer-to-peer connection between outsider device 204 and environment device 210. In a peer-to-peer connection outsider device 204 and environment device 210 may be connected to each other via the Internet. It should be noted that information can be shared directly between the respective devices without the need of a central server to bridge the communication. The media guidance application may retrieve the access rights that allow access to media content or functionality of environment device 210, and may send the access rights to outsider device 204 through the peer-to-peer connection.

In some embodiments, the media guidance application may automatically transmit the access rights for environment device 210 to outsider device 204 in response to determining that the individual has entered Environment 200. For example, if the granddaughter of User 206 enters Environment 200, and the media guidance application determines that the captured video of the soccer game features the granddaughter of User 206 (i.e., the individual in the media asset is related to User 206), the media guidance application on environment device 210 may automatically transmit access rights to outsider device 204.

In some embodiments, the media guidance application may automatically transmit the access rights for environment device 210 to outsider device 204 in response to detecting speech, from User 206, referencing the content of the media asset. Suppose that User 206 speaks to User 202 and asks, "how was the soccer game?". The media guidance application on outsider device 204 may detect the voice of User 206 and identify, using voice recognition and audio clip references from the media guidance database, that the voice is of User 206. Furthermore, the metadata of the media asset may include an identifier "soccer game," which may be determined by using objection recognition on a frame of the media asset, or by the name and/or description of the media asset. The media guidance application may determine that User 206 referenced the identifier of the media asset and may automatically transmit the access rights, prior to determining the degree of interaction between the individual and User 206. Alternatively, User 206 may ask, "how is my granddaughter?". In this scenario, the media guidance application may determine that the media asset features the granddaughter of User 206. In response, the media guidance application may automatically transmit the access rights for environment device 210, to outsider device 204.

The media guidance application on environment device 210 may then generate for display the media asset on environment device 210. For example, the media guidance application on outsider device 204 may send the media asset to environment device 210 via the peer-to-peer connection. The media guidance application on environment device 210 may then generate for display the media asset on environment device 210.

It should be noted that in the examples given previously, the processing for the determination of values such as likelihood, degree of interaction, etc., can be performed by the media guidance application on various devices. For example, the media guidance application may perform the processing on outsider device 204, environment device 210, a remote server, or a different device owned by the first or second user. For example, if User 202 wishes to connect his/her outsider device 204 (e.g., a laptop) to environment device 210 (e.g., a smart TV) owned by User 206, the selectable options on whether to allow outsider device 204 to connect to environment device 210, may instead be displayed on environment device 212 (e.g., a smartphone owned by User 206). In this embodiment, a peer-to-peer network connection may be established between environment device 210 and environment device 212. When environment device 210 receives a discovery message, environment device 210 may forward the information in the discovery message to environment device 212. Thus, if multiple devices in Environment 200 respond to the discovery message of outsider device 204, each device will not perform the same calculations and waste processing. This allows all processing and decision-making of the media guidance application to take place on a single device (e.g., environment device 212) that can perform calculations quickly, or has access to additional information about the interactions of User 206. For example, environment device 210 may not have access to the social media interactions of User 206 (e.g., User 206 did not log on to their social media account on the smart TV). Therefore, the determination of the degree of interaction is more efficiently performed on a device, such as environment device 212, that has access to the interaction data associated with the social media account.

Alternatively, the processing may be divided across all devices in Environment 200. For example, Environment 200 may include two devices of User 206: environment device 210 (e.g., a smart TV), and environment device 212 (e.g., a smartphone). A peer-to-peer network may connect both devices. Each device may hold exclusive profile information of User 206. For example, environment device 210 may be accompanied by an external camera (e.g., a Microsoft Kinect) or an embedded camera that may have stored videos of User 202 and User 206 watching the smart TV together. Once again, the stored videos may not be accessible on other devices, but may still be considered electronic communication because they are digital copies of an interaction between User 202 and User 206. Thus, each device may determine a unique degree of interaction, a unique likelihood, etc., using the steps described previously, and may share the outputs (e.g., individual verdicts on whether to transmit the access rights or block outsider device 204) with the devices in the peer-to-peer network. A voting system may then be utilized by the media guidance application on environment device 210 to determine a final verdict on whether to transmit the access rights or block outsider device 204 (e.g., transmit the access rights if a majority of the devices decide to transmit).

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
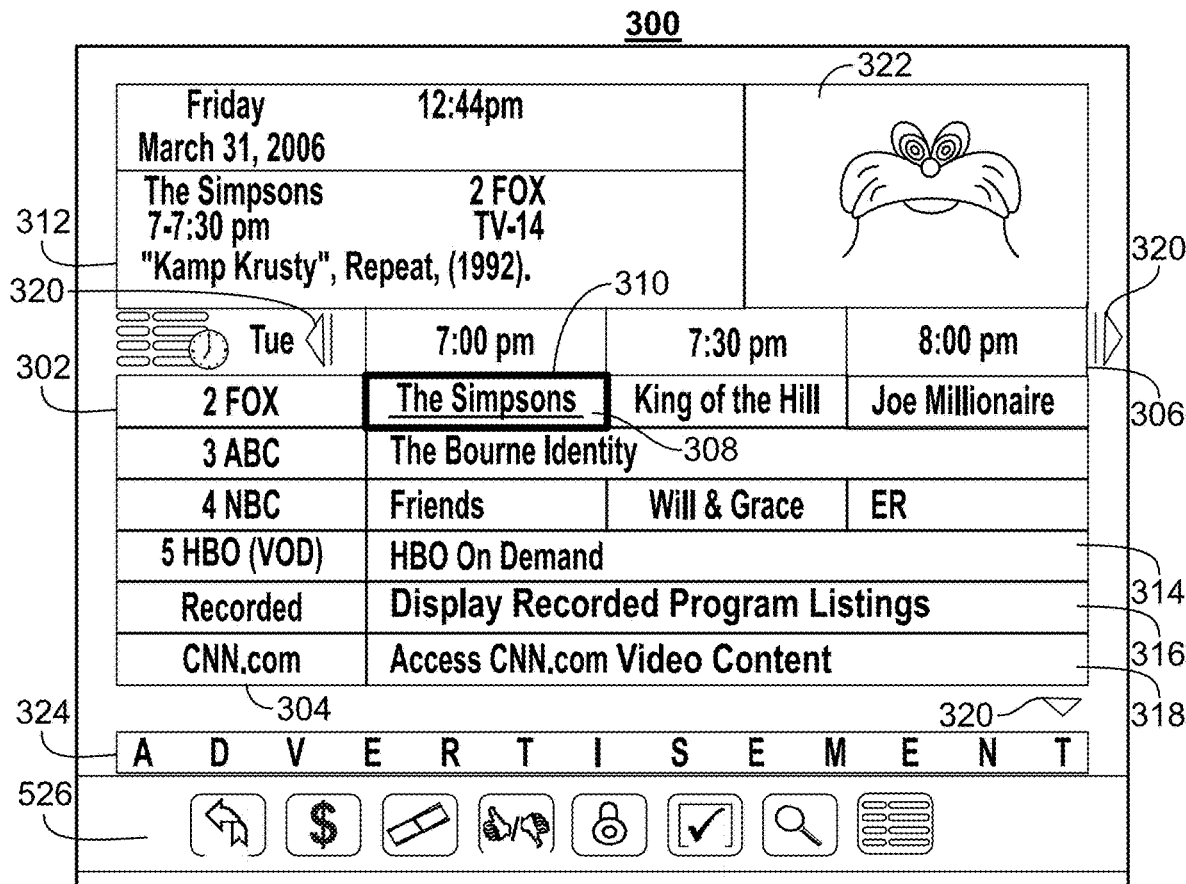
FIGS. 3 and 4 show illustrative examples of display screens generated by a media guidance application in accordance with some embodiments of the disclosure.
Figure 4:
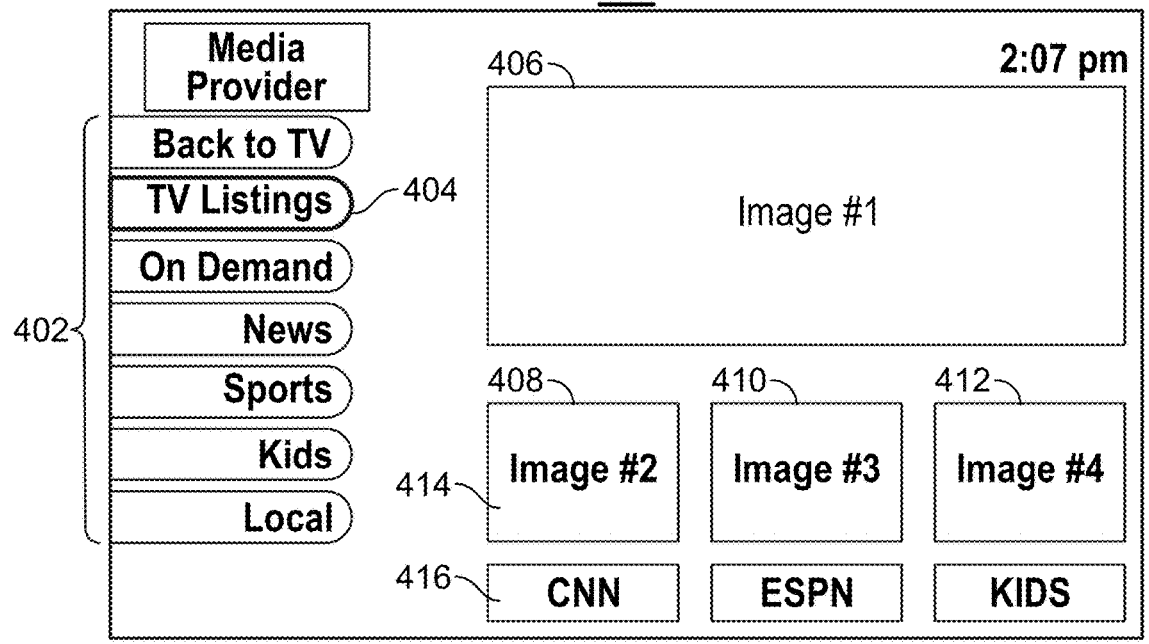

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
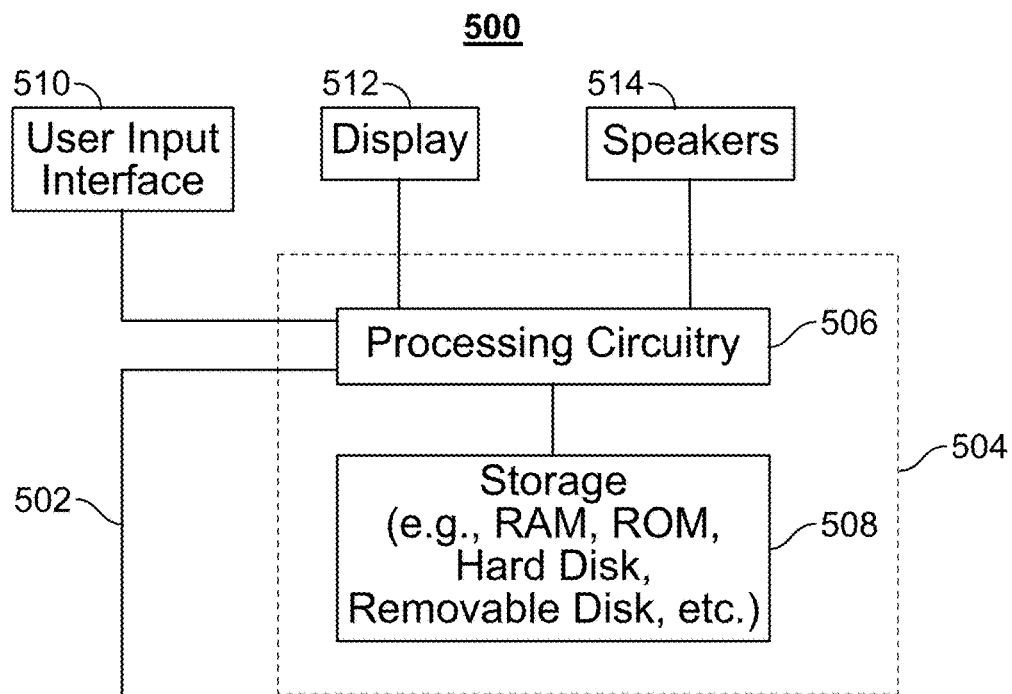
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D.

A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
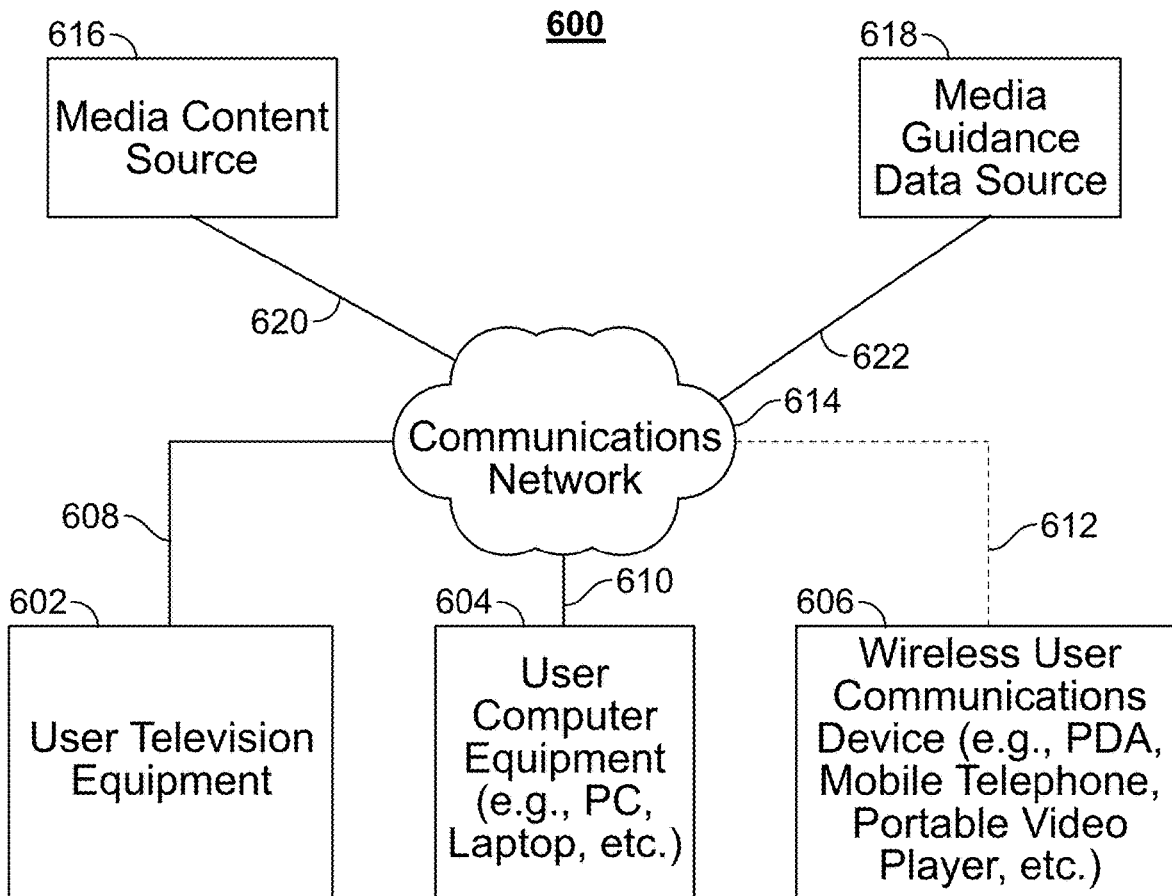
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
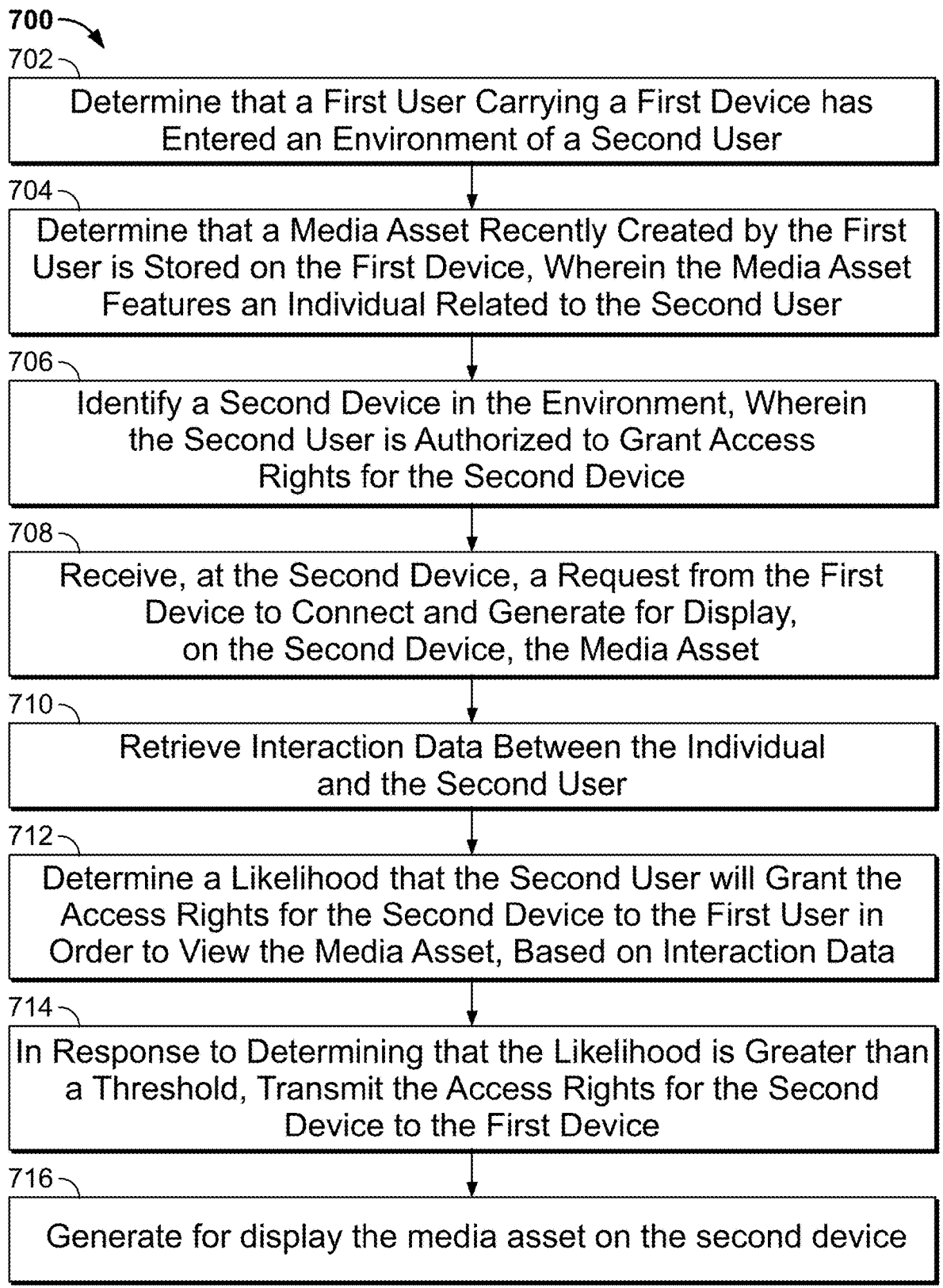
FIG. 7 is a flowchart of an illustrative process for seamlessly connecting to a user's device in order to share and display a media asset featuring an individual closely related to the user, in accordance with some embodiments of the disclosure.

FIG. 7 is a flowchart of an illustrative process for seamlessly connecting to a user's device in order to share and display a media asset featuring an individual closely related to the user, in accordance with some embodiments of the disclosure. It should be noted that process 700 or any step thereof could be performed on, or provided by, any of the devices shown in FIGS. 5-6. For example, process 700 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 700 may be incorporated into or combined with one or more steps of any other process or embodiment (e.g., as described in relation to FIGS. 8-19). Many elements of process 700 have been described above with respect to FIGS. 1 and 2, and those descriptions have full force and effect with respect to the below description of process 700, and thus details on previously-described elements are omitted for the sake of brevity.

Process 700 begins at 702 where control circuitry 504 determines whether a first user carrying a first device has entered an environment of a second user. In response to determining that the first user has not entered the environment, the process stops at 704. In response to determining that the first user has entered the environment, the process continues to 706 where control circuitry 504 determines whether a media asset (e.g., a video) recently created by the first user is stored (e.g., in storage 508) on the first device (e.g., user television equipment 602, user computer equipment 604, or wireless user communications device 606). It should be noted that the media asset must feature an individual related to the second user. In response to determining that a media asset that features an individual related to the user that was recently created is not stored on the first device, the process stops at 704. In response to determining that a media asset that features an individual related to the user that was recently created is stored on the first device, the process continues to 708 where control circuitry 504 identifies, in the environment, a second device (e.g., user television equipment 602, user computer equipment 604, or wireless user communications device 606) that the second user is authorized to grant access rights for. At 710, control circuitry 504 receives, at the second device, a request from the first device to connect and generate for display, on the second device, the media asset (e.g., via communication network 614). At 712, control circuitry 504 retrieves interaction data between the individual and the second user (e.g., via media guidance data source 618 or storage 508 on equipment 604, 606, and/or 608). At 714, control circuitry 504 determines a likelihood that the second user will grant the access rights for the second device to the first user in order to view the media asset, based on interaction data. At 716, control circuitry determines whether the likelihood is greater than a threshold. In response to determining that the likelihood is greater than a threshold, control circuitry 504 transmits the access rights for the second device to the first device (e.g., via communication network 614) at 718. In response to determining that the likelihood is not greater than the threshold, the process stops at 704. At 720, control circuitry 504 generates for display the media asset on the second device (e.g., via display 512).

Figure 8:
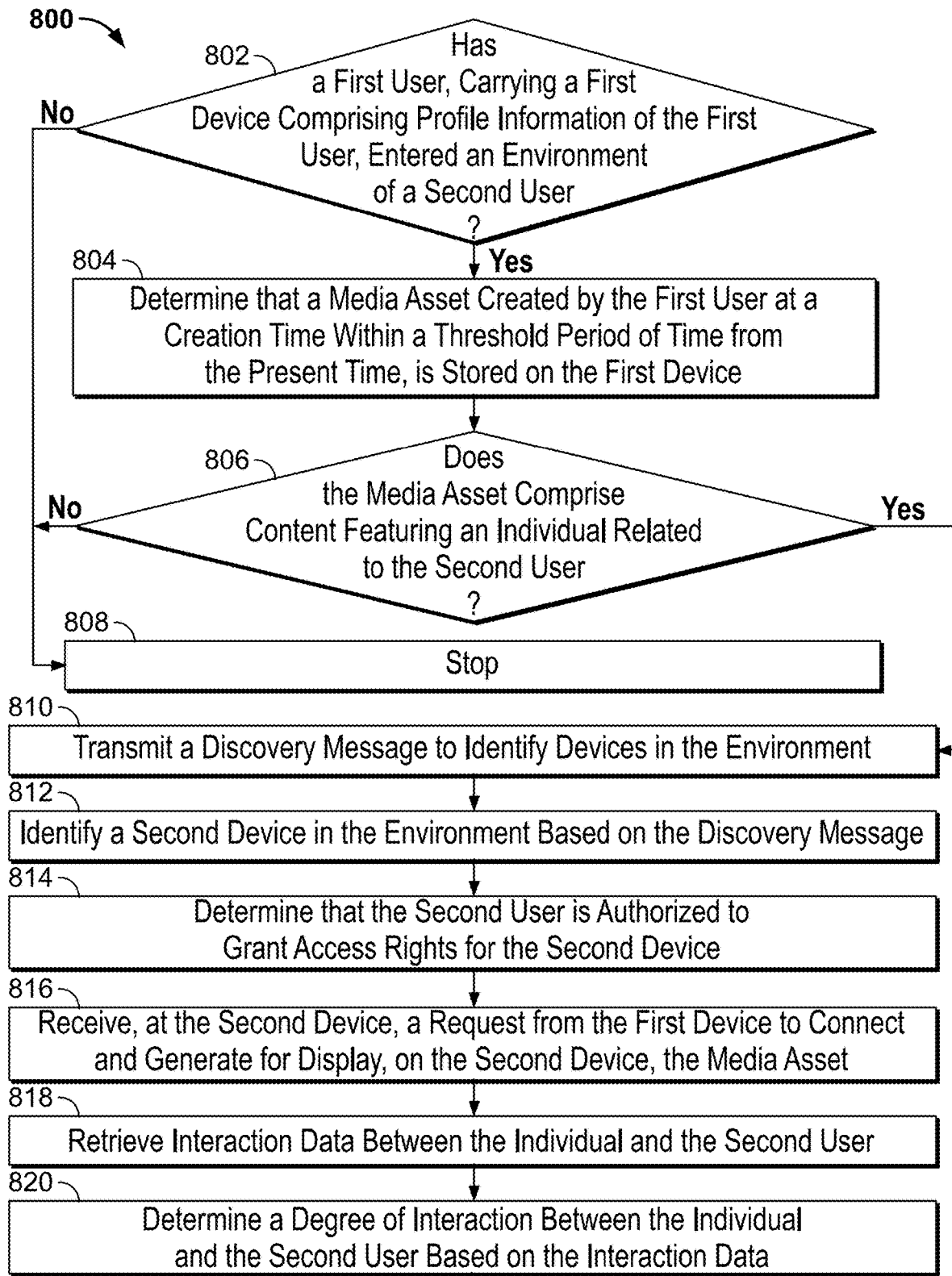
FIG. 8 is a flowchart of a detailed illustrative process for seamlessly connecting to a user's device in order to share and display a media asset featuring an individual closely related to the user, in accordance with some embodiments of the disclosure.
Figure 8:
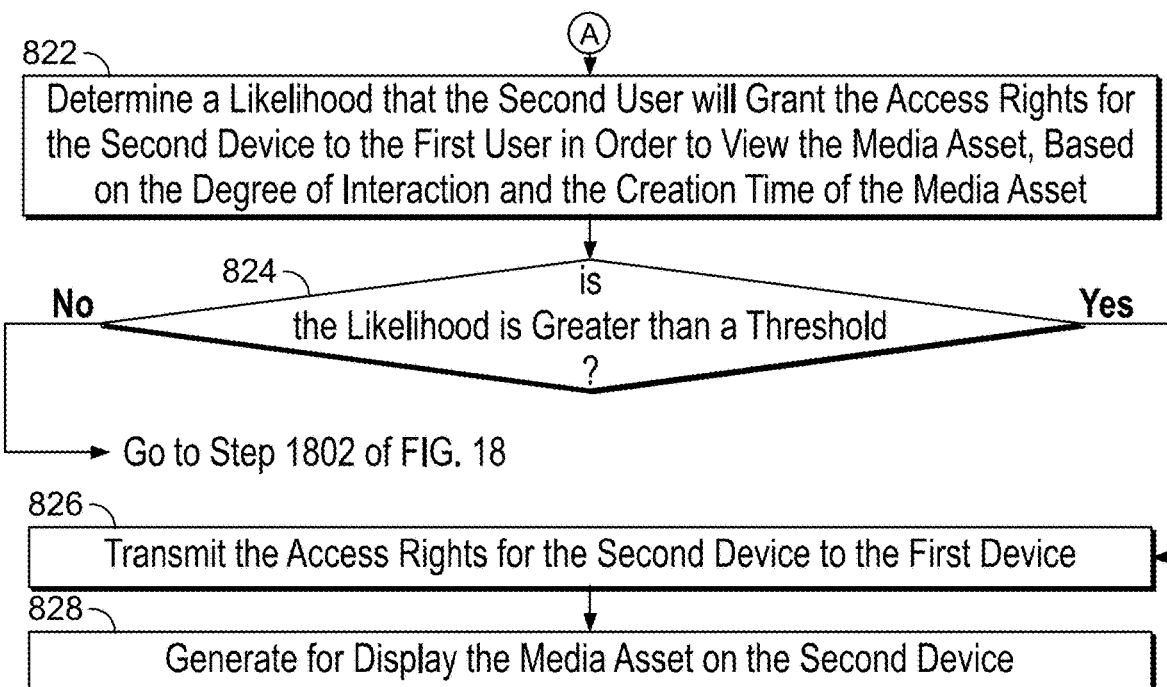

FIG. 8 is a flowchart of a detailed illustrative process for seamlessly connecting to a user's device in order to share and display a media asset featuring an individual closely related to the user, in accordance with some embodiments of the disclosure. It should be noted that process 800 or any step thereof could be performed on, or provided by, any of the devices shown in FIGS. 5-6. For example, process 800 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 800 may be incorporated into or combined with one or more steps of any other process or embodiment (e.g., as described in relation to FIGS. 7 and 9-19). Many elements of process 800 have been described above with respect to FIGS. 1 and 2, and those descriptions have full force and effect with respect to the below description of process 800, and thus details on previously-described elements are omitted for the sake of brevity.

Process 800 begins at 802 where control circuitry 504 determines whether a first user, carrying a first device (e.g., user television equipment 602, user computer equipment 604, or wireless user communications device 606) comprising profile information of the first user (e.g., stored in storage 508), has entered an environment of a second user. In response to determining that the first user has entered the environment of the second user, the process proceeds to 804 where control circuitry 504 determines that a media asset (e.g., a video) created by the first user at a creation time within a threshold period of time from the present time, is stored on the first device (e.g., in storage 508). In response to determining that the first user has not entered the environment of the second user, the process stops at 808. At process 806, control circuitry 504 determines whether the media asset comprises content featuring an individual related to the second user. In response to determining that the media asset comprises content featuring the individual related to the second user, the process proceeds to 810 where control circuitry 504 transmits a discovery message to identify devices in the environment (e.g., via communications network 614). In response to determining that the media asset does not comprise content featuring the individual related to the second user, the process stops at 808. At 812, control circuitry 504 identifies a second device (e.g., user television equipment 602, user computer equipment 604, or wireless user communications device 606) in the environment based on the discovery message. At 814, control circuitry 504 determines that the second user is authorized to grant access rights for the second device. At 816, control circuitry 504 receives, at the second device, a request from the first device to connect and generate for display (e.g., on display 512), on the second device, the media asset. At 818, control circuitry 504 retrieves interaction data between the individual and the second user (e.g., via media guidance data source 618 or storage 508 on equipment 604, 606, and/or 608). At 820, control circuitry 504 determines a degree of interaction between the individual and the second user based on the interaction data. At 822, control circuitry 504 determines a likelihood that the second user will grant the access rights for the second device to the first user in order to view the media asset, based on the degree of interaction and the creation time of the media asset. At 824, control circuitry 504 determines whether the likelihood is greater than a threshold. In response to determining that the likelihood is greater than the threshold, the process proceeds to 826, where control circuitry 504 transmits the access rights for the second device to the first device. In response to determining that the likelihood is not greater than the threshold, process 1700 proceeds to process 1800 of FIG. 18. At 828, control circuitry 504 generates for display the media asset on the second device (e.g., on display 512).

Figure 9:
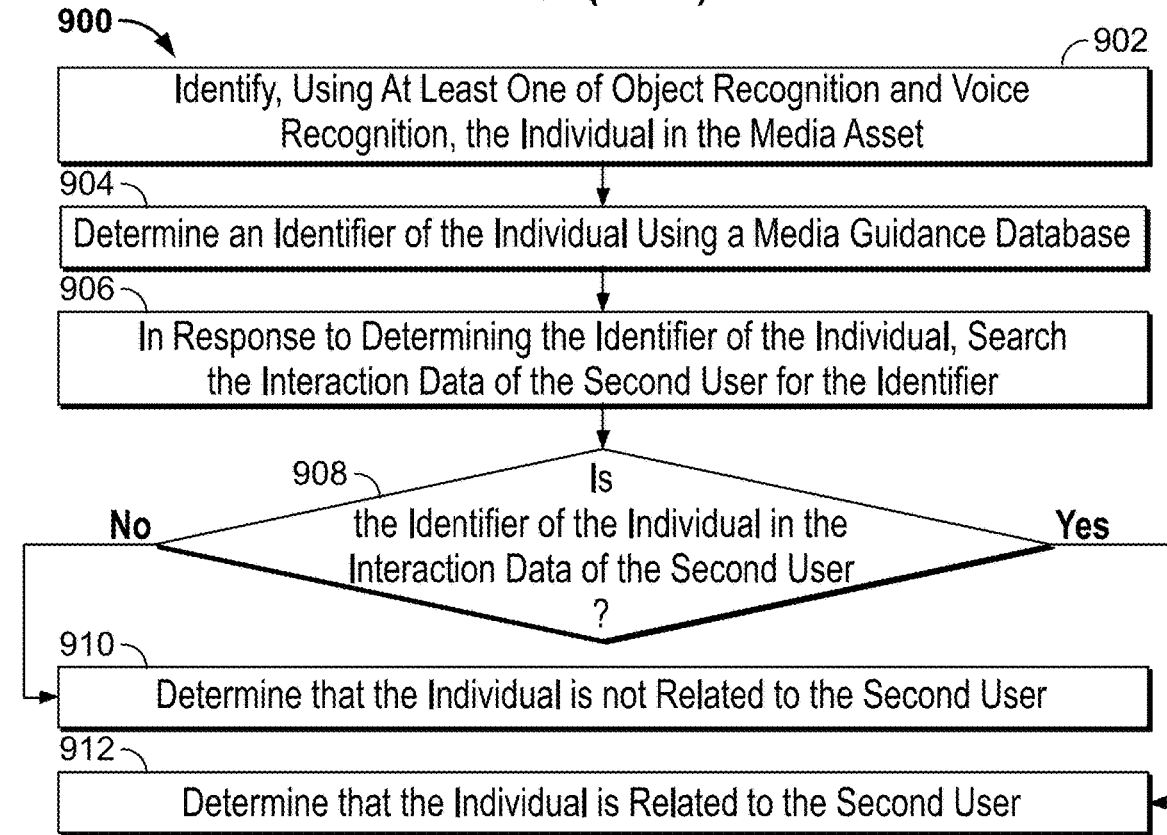
FIG. 9 is a flowchart of a detailed illustrative process for determining whether the media asset comprises the content featuring the individual related to the second user, in accordance with some embodiments of the disclosure.

FIG. 9 is a flowchart of a detailed illustrative process for determining whether the media asset comprises the content featuring the individual related to the second user, in accordance with some embodiments of the disclosure. It should be noted that process 900 or any step thereof could be performed on, or provided by, any of the devices shown in FIGS. 5-6. For example, process 900 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 900 may be incorporated into or combined with one or more steps of any other process or embodiment (e.g., as described in relation to FIGS. 7-8 and 10-19). Many elements of process 900 have been described above with respect to FIGS. 1 and 2, and those descriptions have full force and effect with respect to the below description of process 900, and thus details on previously-described elements are omitted for the sake of brevity.

Process 900 begins at 902 where control circuitry 504 identifies, using at least one of object recognition and voice recognition, the individual in the media asset. At 904, control circuitry 504 determines an identifier of the individual using a media guidance database (e.g., media guidance data source 618). At 906, in response to determining the identifier of the individual, control circuitry 504 searches the interaction data (e.g., in media guidance data source 618 or storage 508 on equipment 604, 606, and/or 608) of the second user for the identifier. At 908, control circuitry 504 determines whether the identifier of the individual is in the interaction data of the second user. At 910, in response to determining that the identifier of the individual is not in the interaction data of the second user, control circuitry 504 determines that the individual is not related to the second user. At 912, in response to determining that the identifier of the individual is in the interaction data of the second user, control circuitry 504 determine that the individual is related to the second user.

Figure 10:
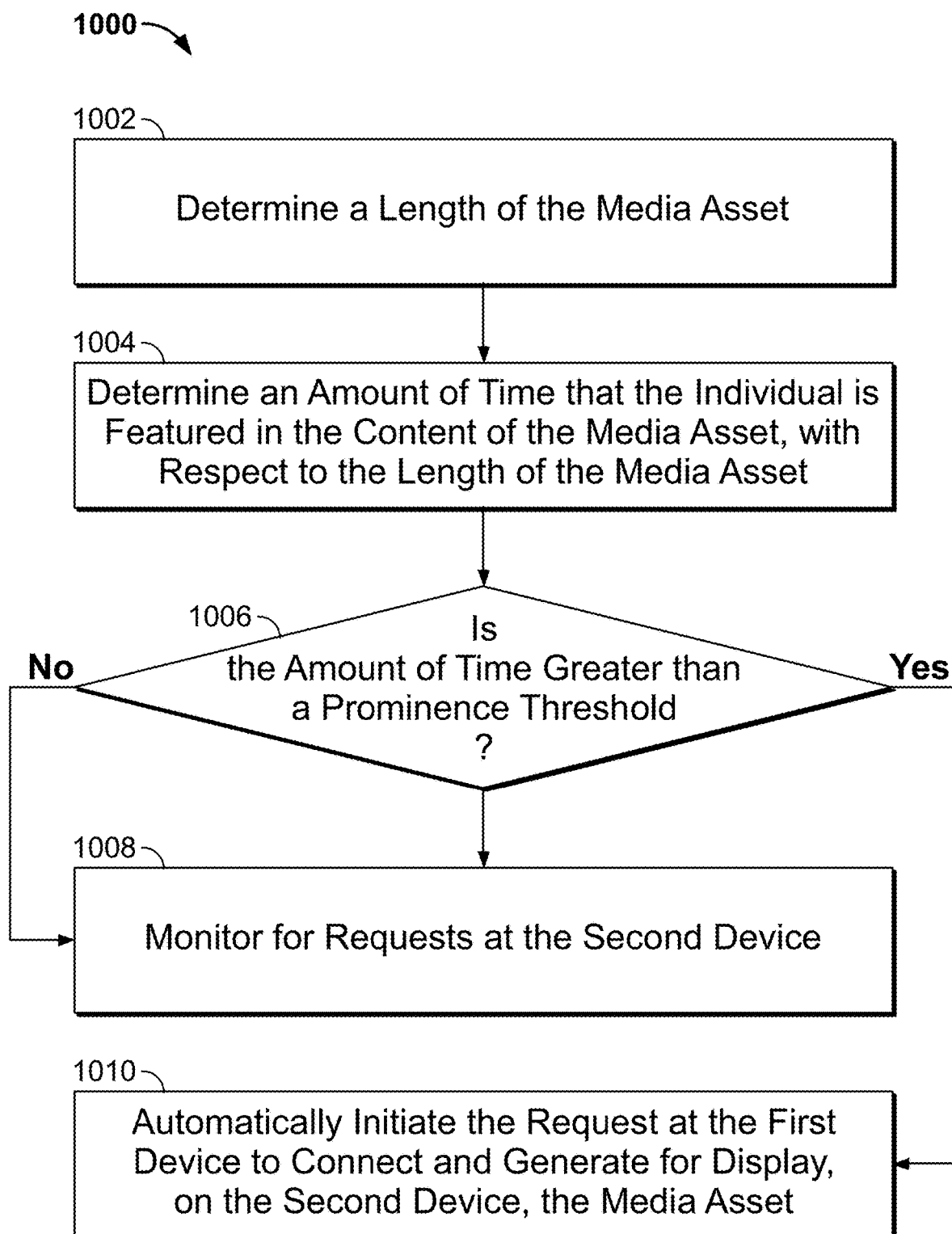
FIG. 10 is a flowchart of a detailed illustrative process for automatically initiating the request at the first device to connect and generate for display, on the second device, the media asset, in accordance with some embodiments of the disclosure.

FIG. 10 is a flowchart of a detailed illustrative process for automatically initiating the request at the first device to connect and generate for display, on the second device, the media asset, in accordance with some embodiments of the disclosure. It should be noted that process 1000 or any step thereof could be performed on, or provided by, any of the devices shown in FIGS. 5-6. For example, process 1000 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 1000 may be incorporated into or combined with one or more steps of any other process or embodiment (e.g., as described in relation to FIGS. 7-9 and 11-19). Many elements of process 1000 have been described above with respect to FIGS. 1 and 2, and those descriptions have full force and effect with respect to the below description of process 1000, and thus details on previously-described elements are omitted for the sake of brevity.

Process 1000 begins at 1002 where control circuitry 504 determines a length of the media asset (e.g., a runtime). At 1004, control circuitry 504 determines an amount of time that the individual is featured in the content of the media asset, with respect to the length of the media asset. At 1006, control circuitry 504 determines whether the amount of time is greater than a prominence threshold (e.g., retrieved from media guidance data source 618 or storage 508). At 1008, in response to determining that the amount of time is not greater than a prominence threshold, control circuitry 504 monitors for requests at the second device (e.g., over communications network 614). At 1010, in response to determining that the amount of time is greater than the prominence threshold, control circuitry 504 automatically initiates the request at the first device to connect and generate for display, on the second device, the media asset (e.g., on display 512).

Figure 11:
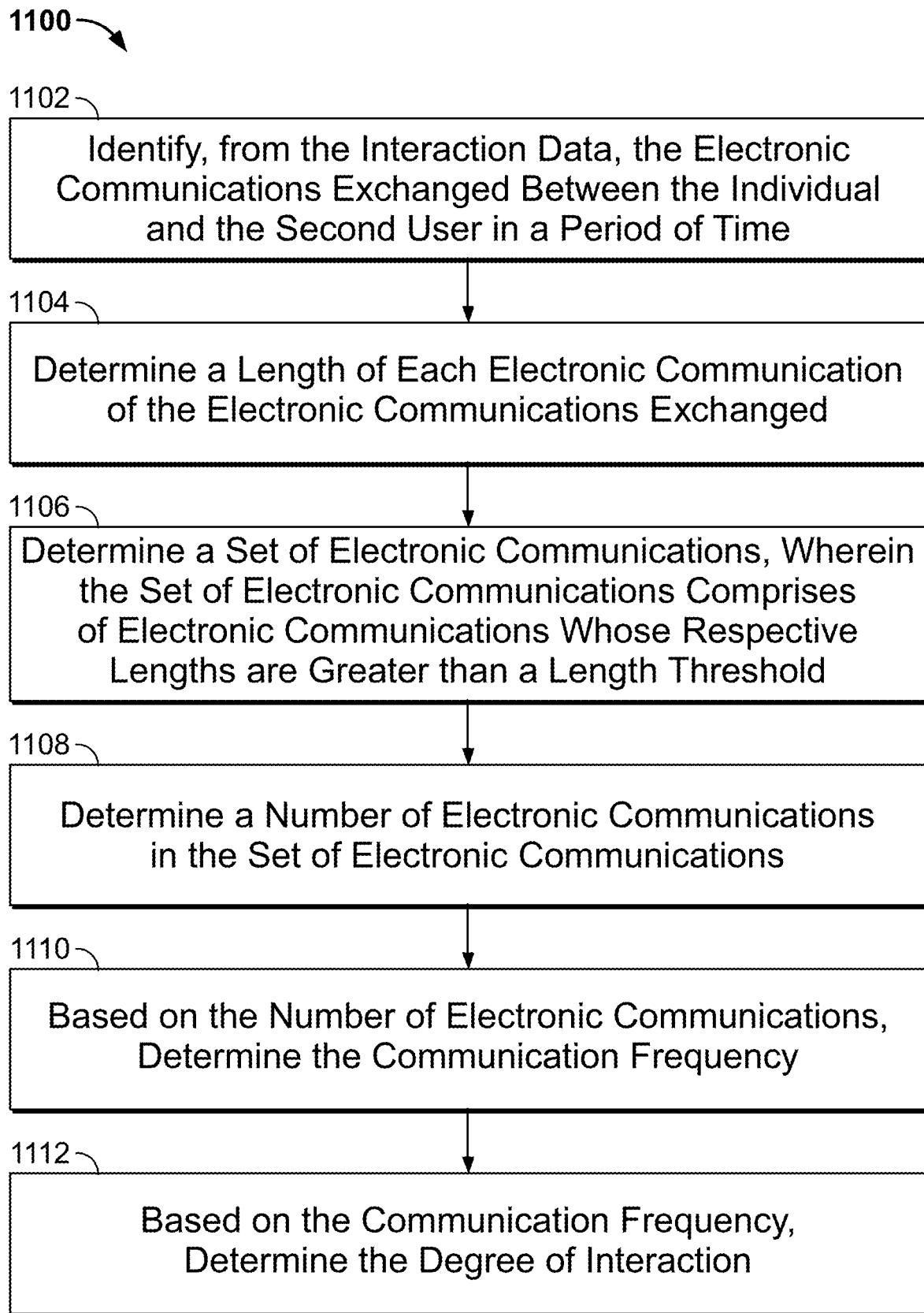
FIG. 11 is a flowchart of a detailed illustrative process for determining the degree of interaction, in accordance with some embodiments of the disclosure.

FIG. 11 is a flowchart of a detailed illustrative process for determining the degree of interaction, in accordance with some embodiments of the disclosure. It should be noted that process 1100 or any step thereof could be performed on, or provided by, any of the devices shown in FIGS. 5-6. For example, process 1100 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 1100 may be incorporated into or combined with one or more steps of any other process or embodiment (e.g., as described in relation to FIGS. 7-10 and 12-19). Many elements of process 1100 have been described above with respect to FIGS. 1 and 2, and those descriptions have full force and effect with respect to the below description of process 1100, and thus details on previously-described elements are omitted for the sake of brevity.

Process 1100 begins at 1102 where control circuitry 504 identifies, from the interaction data (e.g., retrieved from media guidance data source 618 or storage 508), the electronic communications exchanged between the individual and the second user in a period of time. At 1104, control circuitry 504 determines a length of each electronic communication (e.g., number of words in the electronic communication) of the electronic communications exchanged. At 1106, control circuitry 504 determines a set of electronic communications that include electronic communications whose respective lengths are greater than a length threshold (e.g., a minimum word count). At 1108, control circuitry 504 determines a number of electronic communications in the set of electronic communications. At 1110, based on the number of electronic communications, control circuitry 504 determines the communication frequency. At 1112, based on the communication frequency, control circuitry 504 determines the degree of interaction.

Figure 12:
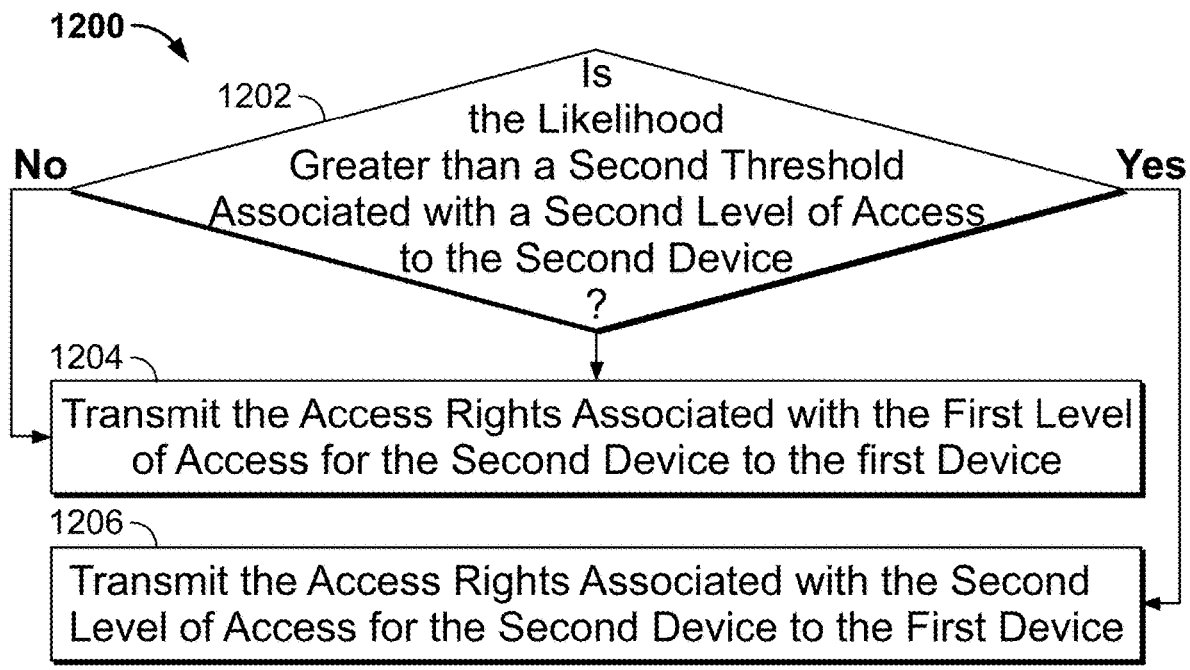
FIG. 12 is a flowchart of a detailed illustrative process for transmitting the access rights of a specific level of access, in accordance with some embodiments of the disclosure.

FIG. 12 is a flowchart of a detailed illustrative process for transmitting the access rights of a specific level of access, in accordance with some embodiments of the disclosure. It should be noted that process 1200 or any step thereof could be performed on, or provided by, any of the devices shown in FIGS. 5-6. For example, process 1200 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 1200 may be incorporated into or combined with one or more steps of any other process or embodiment (e.g., as described in relation to FIGS. 7-11 and 13-19). Many elements of process 1200 have been described above with respect to FIGS. 1 and 2, and those descriptions have full force and effect with respect to the below description of process 1200, and thus details on previously-described elements are omitted for the sake of brevity.

Process 1200 begins at 1202 where control circuitry 504 determines whether the likelihood is greater than a second threshold associated with a second level of access to the second device. At 1204, in response to determining that the likelihood is not greater than a second threshold associated with a second level of access to the second device, control circuitry 504 transmits the access rights associated with the first level of access for the second device to the first device (e.g., via communications network 614). At 1204, in response to determining that the likelihood is greater than a second threshold associated with a second level of access to the second device, control circuitry 504 transmits the access rights associated with the second level of access for the second device to the first device (e.g., via communications network 614).

Figure 13:
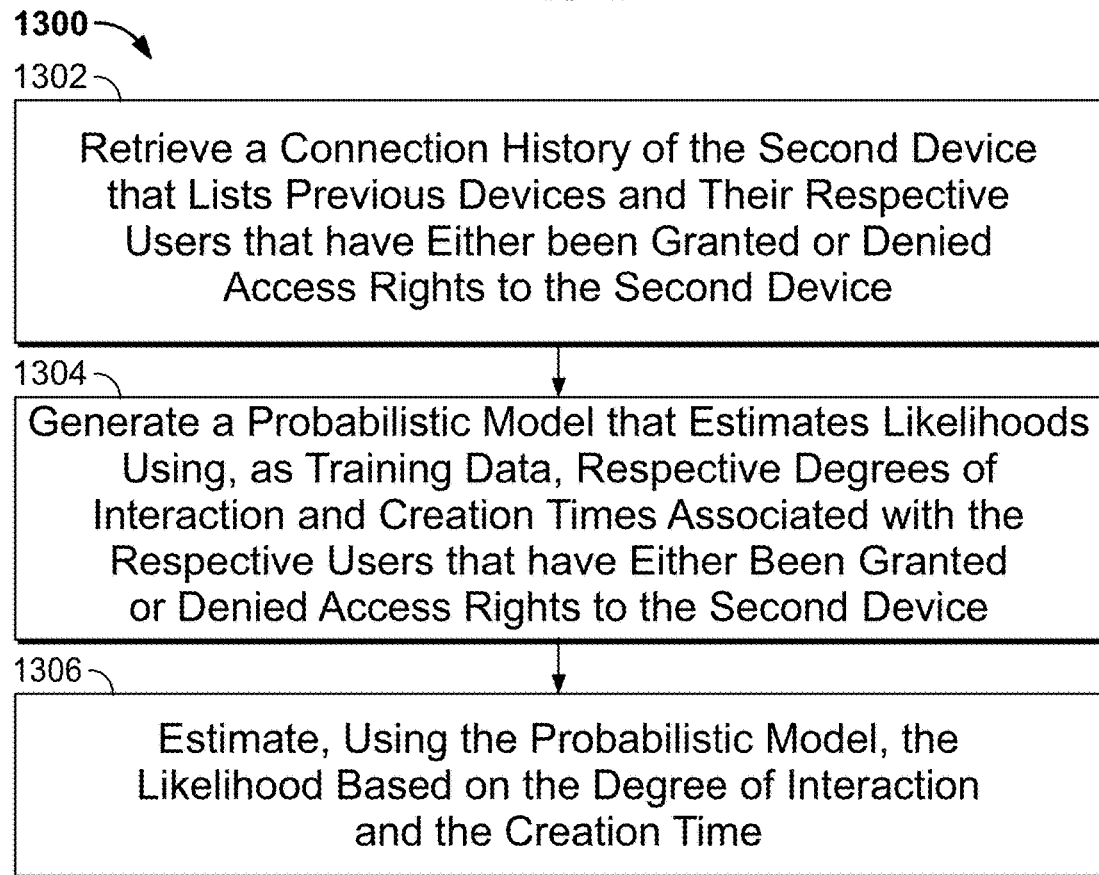
FIG. 13 is a flowchart of a detailed illustrative process for estimating, using a probabilistic model, the likelihood, in accordance with some embodiments of the disclosure.

FIG. 13 is a flowchart of a detailed illustrative process for estimating, using a probabilistic model, the likelihood, in accordance with some embodiments of the disclosure. It should be noted that process 1300 or any step thereof could be performed on, or provided by, any of the devices shown in FIGS. 5-6. For example, process 1300 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 1300 may be incorporated into or combined with one or more steps of any other process or embodiment (e.g., as described in relation to FIGS. 7-12 and 14-19). Many elements of process 1300 have been described above with respect to FIGS. 1 and 2, and those descriptions have full force and effect with respect to the below description of process 1300, and thus details on previously-described elements are omitted for the sake of brevity.

Process 1300 begins at 1302 where control circuitry 504 retrieves a connection history of the second device that lists previous devices and their respective users that have either been granted or denied access rights to the second device (e.g., retrieved from media guidance data source 618 or storage 508). At 1304, control circuitry 504 generates a probabilistic model that estimates likelihoods using, as training data, respective degrees of interaction and creation times associated with the respective users that have either been granted or denied access rights to the second device. At 1306, control circuitry 504 estimates, using the probabilistic model, the likelihood based on the degree of interaction and the creation time.

Figure 14:
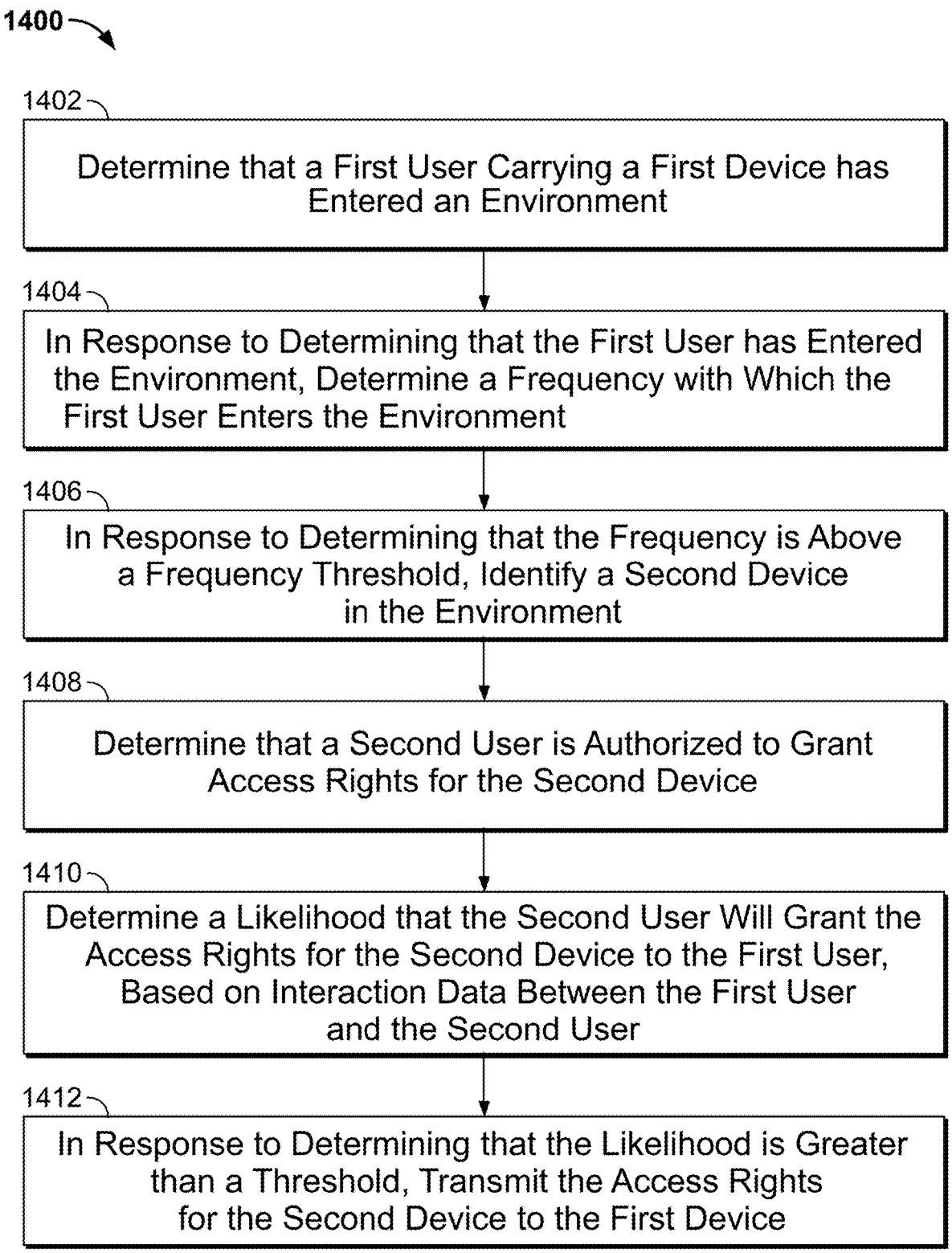
FIG. 14 is a flowchart of an illustrative process for seamlessly connecting devices based on relationships between the users of the respective devices, in accordance with some embodiments of the disclosure.

FIG. 14 is a flowchart of an illustrative process for seamlessly connecting devices based on relationships between the users of the respective devices, in accordance with some embodiments of the disclosure. It should be noted that process 1400 or any step thereof could be performed on, or provided by, any of the devices shown in FIGS. 5-6. For example, process 1400 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 1400 may be incorporated into or combined with one or more steps of any other process or embodiment (e.g., as described in relation to FIGS. 7-13 and 15-19). Many elements of process 1400 have been described above with respect to FIGS. 1 and 2, and those descriptions have full force and effect with respect to the below description of process 1400, and thus details on previously-described elements are omitted for the sake of brevity.

Process 1400 begins at 1402 where control circuitry 504 determines whether a first user carrying a first device (e.g., user television equipment 602, user computer equipment 604, or wireless user communications device 606) has entered an environment. In response to determining that the first user carrying the first device has not entered the environment, the process stops at 1404. At 1406, in response to determining that the first user has entered the environment, control circuitry 504 determines a frequency with which the first user enters the environment (e.g., based on user profile information from storage 508 or media guidance data source 618). At 1408, control circuitry 504 determines whether the frequency is greater than a frequency threshold. In response to determining that the frequency is not greater than the frequency threshold, the process stops at 1404. At 1410, in response to determining that the frequency is greater than the frequency threshold, control circuitry 504 identifies a second device (e.g., user television equipment 602, user computer equipment 604, or wireless user communications device 606) in the environment. At 1412, control circuitry 504 determines that a second user is authorized to grant access rights for the second device. At 1414, control circuitry 504 determines a likelihood that the second user will grant the access rights for the second device to the first user, based on interaction data between the first user and the second user. At 1416, control circuitry 504 determines whether the likelihood is greater than a threshold. In response to determining that the likelihood is not greater than the threshold, the process stops at 1404. At 1418, in response to determining that the likelihood is greater than the threshold, control circuitry 504 transmits the access rights for the second device to the first device (e.g., over communications network 614).

Figure 15:
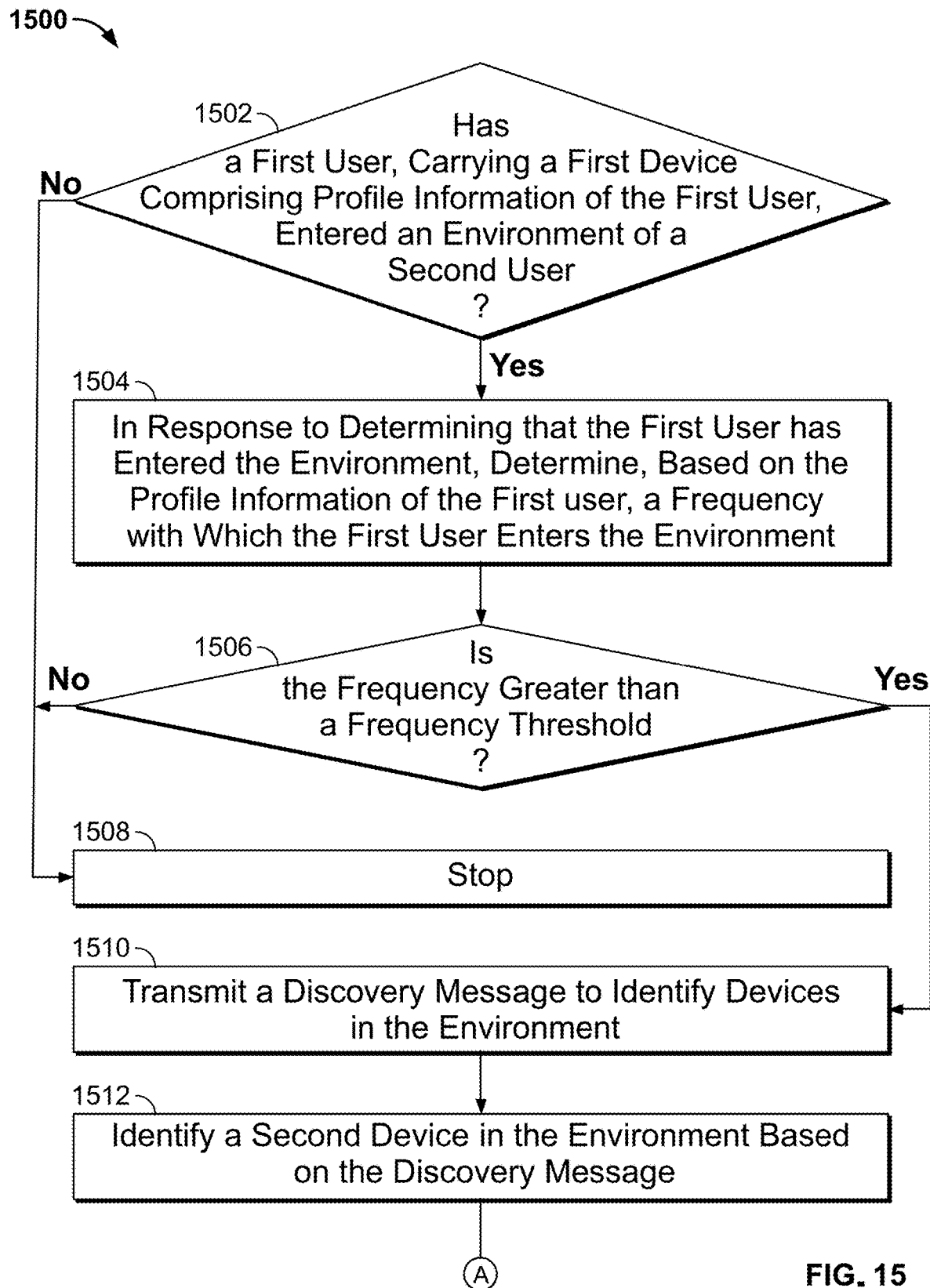
FIG. 15 is a flowchart of a detailed illustrative process seamlessly connecting devices based on relationships between the users of the respective devices, in accordance with some embodiments of the disclosure.
Figure 15:
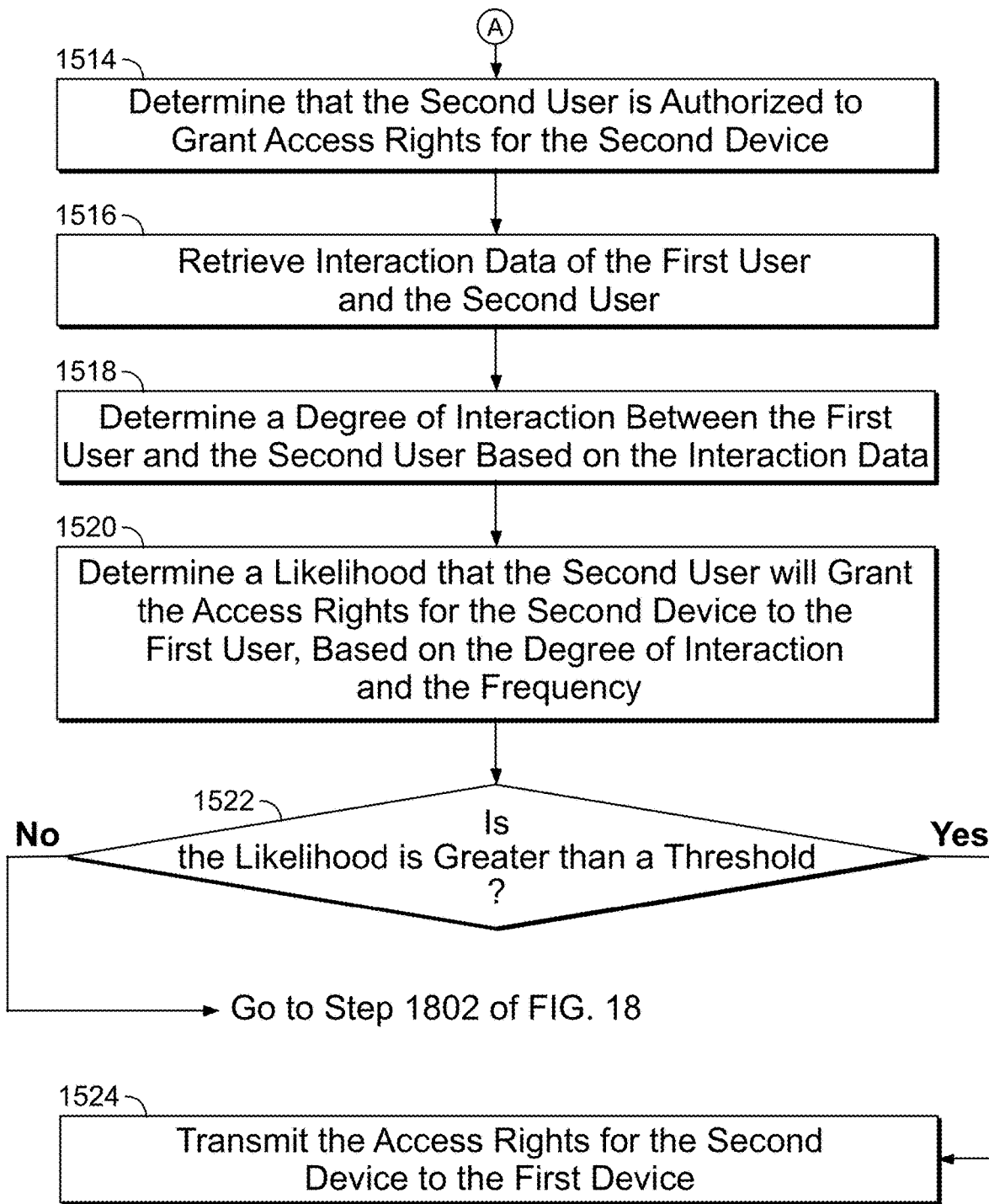

FIG. 15 is a flowchart of a detailed illustrative process seamlessly connecting devices based on relationships between the users of the respective devices, in accordance with some embodiments of the disclosure. It should be noted that process 1500 or any step thereof could be performed on, or provided by, any of the devices shown in FIGS. 5-6. For example, process 1500 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 1500 may be incorporated into or combined with one or more steps of any other process or embodiment (e.g., as described in relation to FIGS. 7-14 and 16-19). Many elements of process 1500 have been described above with respect to FIGS. 1 and 2, and those descriptions have full force and effect with respect to the below description of process 1500, and thus details on previously-described elements are omitted for the sake of brevity.

Process 1500 begins at 1502 where control circuitry 504 determines whether a first user, carrying a first device (e.g., user television equipment 602, user computer equipment 604, or wireless user communications device 606) comprising profile information of the first user, has entered an environment of a second user. In response to determining that the first user has entered the environment of the second user, the process proceeds to 1504 where control circuitry 504 determines, based on the profile information of the first user, a frequency with which the first user enters the environment. In response to determining that the first user has not entered the environment of the second user, the process stops at 1508. At 1506, control circuitry 504 determines whether the frequency is greater than a frequency threshold. In response to determining that the frequency is greater than the frequency threshold, control circuitry 504 transmits a discovery message to identify devices in the environment (e.g., over communications network 614). In response to determining that the frequency is not greater than the frequency threshold, the process stops at 1508. At 1512, control circuitry 504 identifies a second device (e.g., user television equipment 602, user computer equipment 604, or wireless user communications device 606) in the environment based on the discovery message. At 1514, control circuitry 504 determines that the second user is authorized to grant access rights for the second device. At 1516, control circuitry 504 retrieves interaction data of the first user and the second user. At 1518, control circuitry 504 determines a degree of interaction between the first user and the second user based on the interaction data (e.g., via media guidance data source 618 or storage 508 on equipment 604, 606, and/or 608). At 1520, control circuitry 504 determines a likelihood that the second user will grant the access rights for the second device to the first user, based on the degree of interaction and the frequency. At 1522, control circuitry 504 determines whether the likelihood is greater than a threshold. At 1524, in response to determining that the likelihood is greater than the threshold, control circuitry 504 transmits the access rights for the second device to the first device (e.g., via communications network 614). In response to determining that the likelihood is not greater than the threshold, the process proceeds to process 1800 of FIG. 18.

Figure 16:
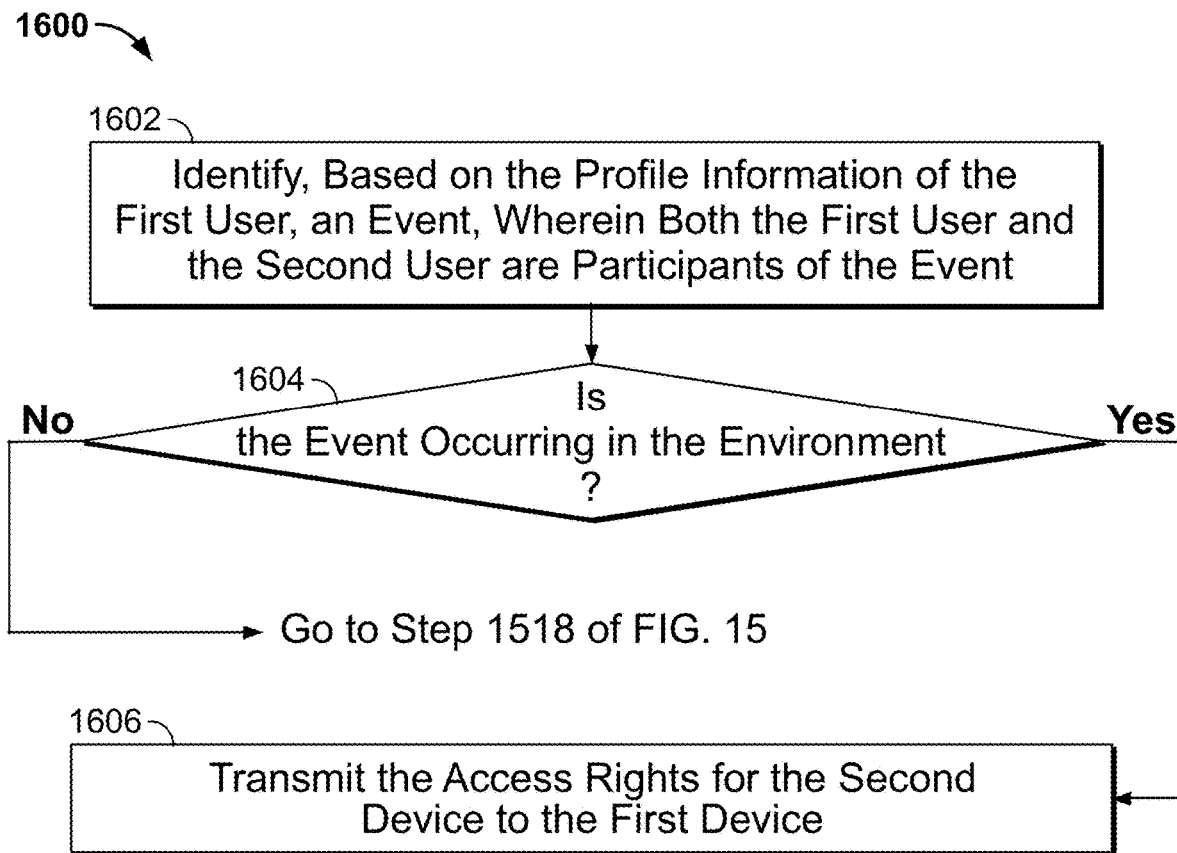
FIG. 16 is a flowchart of a detailed illustrative process for transmitting the access rights based on the occurrence of an event at the environment, in accordance with some embodiments of the disclosure.

FIG. 16 is a flowchart of a detailed illustrative process for transmitting the access rights based on the occurrence of an event at the environment, in accordance with some embodiments of the disclosure. It should be noted that process 1600 or any step thereof could be performed on, or provided by, any of the devices shown in FIGS. 5-6. For example, process 1600 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 1600 may be incorporated into or combined with one or more steps of any other process or embodiment (e.g., as described in relation to FIGS. 7-15 and 17-19). Many elements of process 1600 have been described above with respect to FIGS. 1 and 2, and those descriptions have full force and effect with respect to the below description of process 1600, and thus details on previously-described elements are omitted for the sake of brevity.

Process 1600 begins at 1602 where control circuitry 504 identifies, based on the profile information of the first user (e.g., a user profile in storage 508), an event in which the first user and the second user are participants. At 1604, control circuitry 504 determines whether the event is occurring in the environment. In response to determining that the event is not occurring in the environment, the process proceeds to 1518 of FIG. 5. At 1606, in response to determining that the event is occurring in the environment, control circuitry 504 transmits the access rights for the second device to the first device (e.g., via communications network 614).

Figure 17:
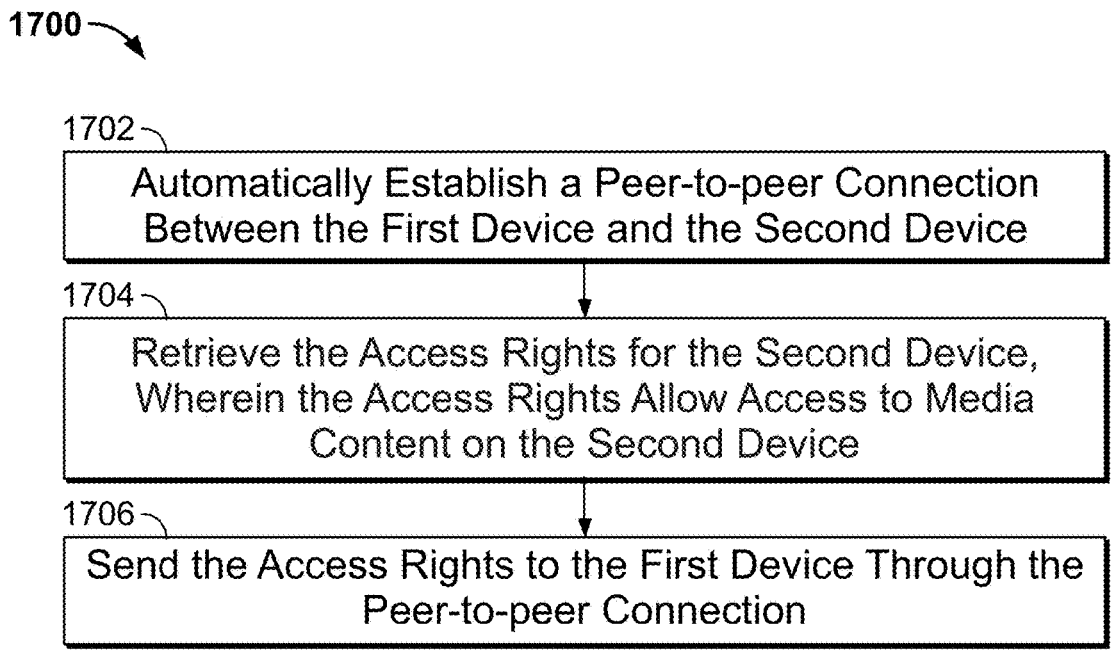
FIG. 17 is a flowchart of a detailed illustrative process for establishing a peer-to-peer connection in order to transmit access rights, in accordance with some embodiments of the disclosure.

FIG. 17 is a flowchart of a detailed illustrative process for establishing a peer-to-peer connection in order to transmit access rights, in accordance with some embodiments of the disclosure. It should be noted that process 1700 or any step thereof could be performed on, or provided by, any of the devices shown in FIGS. 5-6. For example, process 1700 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 1700 may be incorporated into or combined with one or more steps of any other process or embodiment (e.g., as described in relation to FIGS. 7-16 and 18-19). Many elements of process 1700 have been described above with respect to FIGS. 1 and 2, and those descriptions have full force and effect with respect to the below description of process 1700, and thus details on previously-described elements are omitted for the sake of brevity.

Process 1700 begins at 1702 where control circuitry 504 automatically establishes a peer-to-peer connection between the first device and the second device (e.g., communications network 614). At 1704, control circuitry 504 retrieves the access rights for the second device, allowing access to media content on the second device. At 1706, control circuitry 504 sends the access rights to the first device through the peer-to-peer connection (e.g., over communications network 614).

Figure 18:
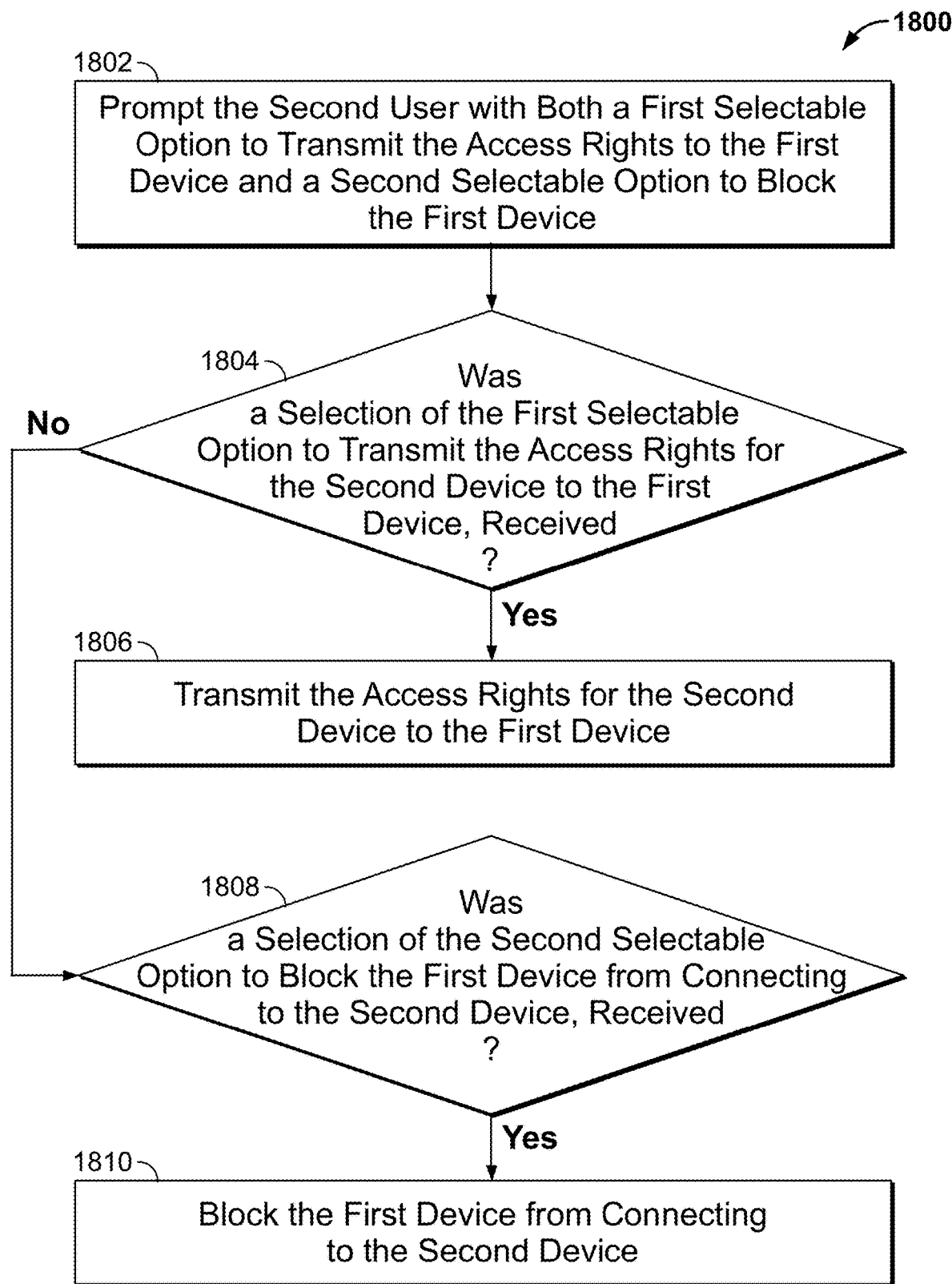
FIG. 18 is a flowchart of a detailed illustrative process for prompting the second user to select between options to transmit the access rights or block the first device, in accordance with some embodiments of the disclosure.

FIG. 18 is a flowchart of a detailed illustrative process for prompting the second user to select between options to transmit the access rights or block the first device, in accordance with some embodiments of the disclosure. It should be noted that process 1800 or any step thereof could be performed on, or provided by, any of the devices shown in FIGS. 5-6. For example, process 1800 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 1800 may be incorporated into or combined with one or more steps of any other process or embodiment (e.g., as described in relation to FIGS. 7-17 and 19). Many elements of process 1800 have been described above with respect to FIGS. 1 and 2, and those descriptions have full force and effect with respect to the below description of process 1800, and thus details on previously-described elements are omitted for the sake of brevity.

Process 1800 begins at 1802 where control circuitry 504 prompts the second user with both a first selectable option to transmit the access rights to the first device and a second selectable option to block the first device (e.g., on user input interface 510). At 1804, control circuitry 504 determines whether a selection of the first selectable option to transmit the access rights for the second device to the first device was received (e.g., via I/O Path 502). At 1806, in response to determining that the first selectable option was received, control circuitry 504 transmits the access rights for the second device to the first device (e.g., over communications network 614). At 1808, in response to determining that the first selectable option was not received, control circuitry 504 determines whether a selection of the second selectable option to block the first device from connecting to the second device was received (e.g., via I/O Path 502). At 1810, in response to determining that the second selectable option was received, control circuitry 504 blocks the first device from connecting to the second device (e.g., via communications network 614). In response to determining that no selection was received, control circuitry 504 may cause a timeout and may automatically make a decision on whether to transmit the access rights or block the device.

Figure 19:
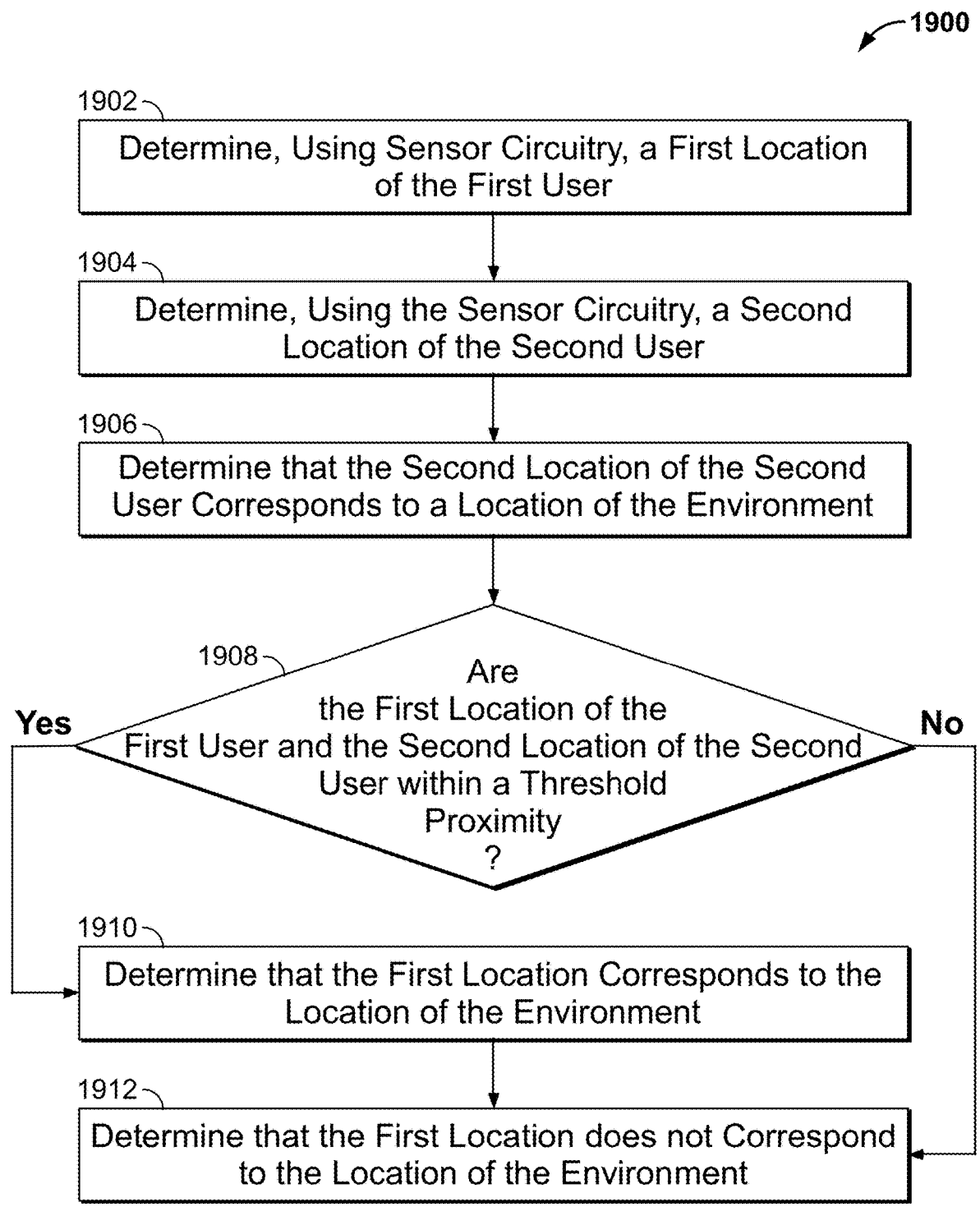
FIG. 19 is a flowchart of a detailed illustrative process for determining whether the first user is in the environment, in accordance with some embodiments of the disclosure.

FIG. 19 is a flowchart of a detailed illustrative process for determining whether the first user is in the environment, in accordance with some embodiments of the disclosure. It should be noted that process 1900 or any step thereof could be performed on, or provided by, any of the devices shown in FIGS. 5-6. For example, process 1900 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 1900 may be incorporated into or combined with one or more steps of any other process or embodiment (e.g., as described in relation to FIGS. 7-18). Many elements of process 1900 have been described above with respect to FIGS. 1 and 2, and those descriptions have full force and effect with respect to the below description of process 1900, and thus details on previously-described elements are omitted for the sake of brevity.

Process 1900 begins at 1902 where control circuitry 504 determines, using sensor circuitry (e.g., of equipment devices 602, 604, and/or 606), a first location of the first user. At 1904, control circuitry 504 determines, using the sensor circuitry, a second location of the second user. At 1906, control circuitry 504 determines that the second location of the second user corresponds to a location of the environment (e.g., based on data from media guidance data source 618 or a user profile stored in storage 508). At 1908, control circuitry 504 determines whether the first location of the first user and the second location of the second user are within a threshold proximity. At 1910, in response to determining that the first location of the first user and the second location of the second user are within a threshold proximity, control circuitry 504 determines that the first location corresponds to the location of the environment. At 1912, in response to determining that the first location of the first user and the second location of the second user are within a threshold proximity, control circuitry 504 determines that the first location does not correspond to the location of the environment.

It should be noted that processes 700-1900 or any step thereof could be performed on, or provided by, any of the devices shows in FIGS. 1, 2 and 5-6. For example, any of processes 700-1900 may be executed by control circuitry 504 (FIG. 5) as instructed by control circuitry implemented on user equipment 602, 604, 606 (FIG. 5), and/or a user equipment for selecting a recommendation. In addition, one or more steps of processes 700-1900 may be incorporated into or combined with one or more steps of any other process or embodiment.

It is contemplated that the steps or descriptions of each of FIGS. 7-19 may be used with any other embodiment of this disclosure. In addition, the steps and descriptions described in relation to FIGS. 7-19 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1, 2 and 5-6 could be used to perform one or more of the steps in FIGS. 7-19.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for seamlessly connecting to a user's device in order to share and display a media asset featuring content of interest to the user, the method comprising:
    determining that a first device associated with a first user has entered an environment in which a second device associated with a second user is located;
    determining whether a media asset stored on the first device is of interest to the second user; and
    in response to determining that the media asset stored on the first device is of interest to the second user:
        determining whether a number of times that devices associated with the first user have been granted access rights to devices associated with the second user meets or exceeds a threshold; and
        based on determining that the number of times that devices associated with the first user have been granted access rights to devices associated with the second user meets or exceeds the threshold, automatically granting, to the first device, access rights to the second device.

2. The method of claim 1, wherein the access rights allow access to media content on the second device.

3. The method of claim 1, further comprising:
    retrieving a connection history of the second device;
    wherein determining whether the number of times that devices associated with the first user have been granted access rights to devices associated with the second user meets or exceeds the threshold further comprises determining, based on the connection history of the second device, the number of times that devices associated with the first user have been granted access rights to the second device.

4. The method of claim 3, wherein the connection history comprises a plurality of connection timestamps, each timestamp associated with respective data identifying a device that was connected to the second device, a user associated with the identified device, and whether the identified device was granted or denied access rights to the second device.

5. The method of claim 4, wherein determining, based on the connection history of the second device, the number of times that devices associated with the first user have been granted access rights to the second device further comprises:
    determining a subset of timestamps whose associated data includes the first user; and
    counting a number of timestamps of the subset of timestamps whose associated data includes an indication that the identified device was granted access rights to the second device.

6. The method of claim 1, wherein granting, to the first device, access rights to the second device comprises transmitting access rights for the second device to the first device.

7. The method of claim 6, wherein transmitting the access rights for the second device further comprises:
    determining, based on profile information on the first device, that an event is occurring in the environment, wherein both the first user and the second user are participants of the event; and
    in response to determining that the event is occurring in the environment, transmitting the access rights for the second device to the first device.

8. The method of claim 6, wherein transmitting the access rights for the second device further comprises:
    automatically establishing a peer-to-peer connection between the first device and the second device;
    retrieving the access rights for the second device; and
    sending the access rights to the first device through the peer-to-peer connection.

9. The method of claim 6, wherein transmitting the access rights for the second device further comprises:
    prompting the second user with selectable option to block the first device; and
    in response to receiving a selection of the selectable option, blocking the first device from connecting to the second device.

10. The method of claim 1, wherein determining that the first device has entered the environment in which the second device is located further comprises:
    determining, using sensor circuitry, a first location of the first device;
    determining, using the sensor circuitry, a second location of the second device;
    determining that the first location of the first user and the second location of the second user are within a threshold proximity; and
    in response to determining that the first location and the second location are within the threshold proximity, determining that the first location corresponds to a location of the environment in which the second device is located.

11. A system for seamlessly connecting to a user's device in order to share and display a media asset featuring content of interest to the user, the system comprising:
    control circuitry configured to:
        determine that a first device associated with a first user has entered an environment in which a second device associated with a second user is located;
        determine whether a media asset stored on the first device is of interest to the second user; and
        in response to determining that the media asset stored on the first device is of interest to the second user:
            determine whether a number of times that devices associated with the first user have been granted access rights to devices associated with the second user meets or exceeds a threshold; and based on determining that the number of times that devices associated with the first user have been granted access rights to devices associated with the second user meets or exceeds the threshold, automatically grant, to the first device, access rights to the second device.

12. The system of claim 11, wherein the access rights allow access to media content on the second device.

13. The system of claim 11, wherein the control circuitry is further configured to:

retrieve a connection history of the second device;

wherein the control circuitry configured to determine whether the number of times that devices associated with the first user have been granted access rights to devices associated with the second user meets or exceeds the threshold is further configured to determine, based on the connection history of the second device, the number of times that devices associated with the first user have been granted access rights to the second device.

14. The system of claim 13, wherein the connection history comprises a plurality of connection timestamps, each timestamp associated with respective data identifying a device that was connected to the second device, a user associated with the identified device, and whether the identified device was granted or denied access rights to the second device.

15. The system of claim 14, wherein the control circuitry configured to determine, based on the connection history of the second device, the number of times that devices associated with the first user have been granted access rights to the second device is further configured to:

determine a subset of timestamps whose associated data includes the first user; and count a number of timestamps of the subset of timestamps whose associated data includes an indication that the identified device was granted access rights to the second device.

16. The system of claim 11, wherein the control circuitry configured to grant, to the first device, access rights to the second device is further configured to transmit access rights for the second device to the first device.

17. The system of claim 16, wherein the control circuitry configured to transmit the access rights for the second device is further configured to:

determine, based on profile information on the first device, that an event is occurring in the environment, wherein both the first user and the second user are participants of the event; and in response to determining that the event is occurring in the environment, transmit the access rights for the second device to the first device.

18. The system of claim 16, wherein the control circuitry configured to transmit the access rights for the second device is further configured to:

automatically establish a peer-to-peer connection between the first device and the second device;

retrieve the access rights for the second device; and send the access rights to the first device through the peer-to-peer connection.

19. The system of claim 16, wherein the control circuitry configured to transmit the access rights for the second device is further configured to:

prompt the second user with selectable option to block the first device; and in response to receiving a selection of the selectable option, block the first device from connecting to the second device.

20. The system of claim 11, wherein the control circuitry configured to determine that the first device has entered the environment in which the second device is located is further configured to:

determine, using sensor circuitry, a first location of the first device;

determine, using the sensor circuitry, a second location of the second device;

determine that the first location of the first user and the second location of the second user are within a threshold proximity; and in response to determining that the first location and the second location are within the threshold proximity, determine that the first location corresponds to a location of the environment in which the second device is located.

* * * * *